(12) United States Patent
Wang et al.

(10) Patent No.: US 11,296,615 B2
(45) Date of Patent: Apr. 5, 2022

(54) CASCADED H-BRIDGE CONVERTERS FOR BATTERY ENERGY STORAGE SYSTEMS

(71) Applicant: University of Florida Research Foundation, Incorporated, Gainesville, FL (US)

(72) Inventors: Shuo Wang, Gainesville, FL (US); Amirhossein Moeini, Rolla, MO (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 0 days.

(21) Appl. No.: 16/927,177

(22) Filed: Jul. 13, 2020

(65) Prior Publication Data
US 2021/0021206 A1    Jan. 21, 2021

Related U.S. Application Data

(60) Provisional application No. 62/876,469, filed on Jul. 19, 2019.

(51) Int. Cl.
*H02M 7/219* (2006.01)
*H02M 1/14* (2006.01)
*H02M 1/12* (2006.01)
*H02M 1/00* (2006.01)

(52) U.S. Cl.
CPC ............. *H02M 7/219* (2013.01); *H02M 1/14* (2013.01); *H02J 2207/20* (2020.01);
(Continued)

(58) Field of Classification Search
CPC ...... H02M 1/0074; H02M 1/008; H02M 1/12; H02M 1/14–15; H02M 7/219; H02M 7/4835
See application file for complete search history.

(56) References Cited

U.S. PATENT DOCUMENTS

2013/0128629 A1*  5/2013  Clare ..................... H02J 3/36
                                                       363/35
2015/0349536 A1* 12/2015  Davidson .............. H02J 1/02
                                                       307/80
(Continued)

OTHER PUBLICATIONS

Moeini, Amirhossein et al. *A Current-Reference-Based Selective Harmonic Current Mitigation PWM Technique to Improve the Performance of Cascaded H-Bridge Multilevel Active Rectifiers*, IEEE Transactions on Industrial Electronics, vol. 65, No. 1, pp. 727-737, Jan. 2018.
(Continued)

*Primary Examiner* — Fred E Finch, III
(74) *Attorney, Agent, or Firm* — Alston & Bird LLP

(57) ABSTRACT

Systems and methods are configured to control DC side current harmonics of a cascaded H-bridge (CHB) converter that includes a plurality of cells. In various embodiments, an odd-order current harmonic is injected at the AC side of the CHB converter based on an optimization of a constrained optimization problem to achieve at least one of balancing the DC side current harmonics of the plurality of cells, reducing the DC side current harmonics of the plurality of cells, and meeting the requirements of the IEEE 519 standard. The optimization problem may include a cost function based on switching transitions of the CHB converter and at least one constraint based on, for example, an AC side current harmonic, a maximum demand load current of the CHB converter base on the IEEE 519 standard, and a zero-order current harmonic and an hth-order current harmonic for each cell of the CHB converter.

21 Claims, 34 Drawing Sheets

(52) U.S. Cl.
CPC .......... *H02M 1/008* (2021.05); *H02M 1/0074* (2021.05); *H02M 1/12* (2013.01)

(56) References Cited

U.S. PATENT DOCUMENTS

| | | | |
|---|---|---|---|
| 2016/0118908 A1* | 4/2016 | Bhalodi | H02M 7/483 363/89 |
| 2019/0305667 A1* | 10/2019 | Wang | H02M 1/12 |
| 2020/0177096 A1* | 6/2020 | Ginnareddy | H02M 7/5387 |
| 2020/0244181 A1* | 7/2020 | Trainer | H02M 1/32 |

OTHER PUBLICATIONS

Maharjan, Laxman et al. *Active-Power Control Of Individual Converter Cells For A Battery Energy Storage System Based On A Multilevel Cascade PWM Converter*, IEEE Transactions On Power Electronics, vol. 27, No. 3, pp. 1099-1107, Mar. 2012.

Li, Zhongxi et al. *Current Injection Methods for Ripple-Current Suppression in Delta-Configured Split-Battery Energy Storage*, IEEE Transactions On Power Electronics, vol. 34, No. 8, pp. 7411-7421, Aug. 2019.

Tang, Yi. Et al. *Decoupling of Fluctuating Power in Single-Phase Systems Through a Symmetrical Half-Bridge Circuit*, IEEE Transactions On Power Electronics, vol. 30, No. 4, pp. 1855-1865, Apr. 2015.

*IEEE Recommended Practice and Requirements for Harmonic Control In Electric Power Systems*, IEEE Standards Association, IEEE Std 519™—2014 (Revision of IEEE Std 519-1992), (29 pages), Jun. 11, 2014.

* cited by examiner

CASCADED H-BRIDGE CONVERTERS FOR BATTERY ENERGY STORAGE SYSTEMS

CROSS-REFERENCE TO RELATED APPLICATIONS

This application claims the benefit of U.S. Provisional Patent Application Ser. No. 62/876,469, filed Jul. 19, 2019, which is incorporated herein by reference in its entirety, including any figures, tables, and drawings.

GOVERNMENT FUNDING

This invention was made with government support under 1540118 awarded by the National Science Foundation. The government has certain rights in the invention.

TECHNICAL FIELD

The present disclosure relates to the technical field of converters used in battery energy storage systems and in particular, cascaded H-bridge (CHB) converters.

BACKGROUND

Battery energy storage systems (BESSs) play an important role in power grids, renewable energies, smart grids, and electric vehicle charging stations (collectively referred to as power grids). Accordingly, multilevel converters have been widely used in AC to DC current conversion for power grids. For instance, multilevel converters containing at least four IGBTs (insulated-gate bipolar transistors) in an H-bridge arrangement have gained popularity in high current DC motors applications for trains, buses and passenger cars. Among these converters, the cascaded H-bridge converter, also known as a CHB converter, can generate AC voltage from the DC voltage that exist in the DC side of the converter. In addition, a CHB converter allows submodule capacitors to be inserted into the circuit in either polarity. This capability confers additional flexibility in controlling the CHB converter and allows the converter to block fault current which arises from a short circuit between the positive and negative DC terminals. Furthermore, this capability allows the DC voltage to be of either polarity, giving rise to the possibility of a hybrid line-commutated converter and a voltage-source converter in high voltage DC systems, avoiding the need for filtering in most instances.

Accordingly, multilevel converters can be connected to a BESS to charge or discharge the batteries or control the active or reactive power that is injected to a power grid. However, a disadvantage of conventional multilevel converters is their slightly inferior harmonic performance that has become a significant drawback for using these converters with power grids involving batteries. In addition, multilevel converters are expected to meet the requirements of standards, increase the efficiency of the converter, and reduce the size of passive filters.

Also, due to the existing zeroth and even-order power harmonics (2nd, 4th, . . . ) at the DC sides of CHB converters, it is often necessary to use big decoupling DC capacitors at the DC sides of the converters to control these low even-order current harmonics (2nd, 4th, . . . ). If a small capacitor is used instead on the DC side of a CHB converter, then almost all of the current harmonics (2nd, 4th, . . . ) are passed through the BESS which can increase losses and degrade the lifespan of the batteries.

A technique can be used that involves applying big current harmonics (3rd, 5th, . . . ) at the AC side of the CHB converter to control the even-order harmonics of the DC side of the converter. However, to eliminate the low-order current harmonics on the DC side, huge AC current harmonics that cannot meet the requirements of the standard need to be injected on each phase of the three-phase delta connection of the CHB converter. These huge AC current harmonics used to eliminate the DC current harmonics also lead to circulating currents at the AC side that can significantly increase the conduction power loss of the converter. In three-phase applications, the circulating currents will significantly increase the losses of the converter. Moreover, when employed for a high-switching frequency modulation technique (phase shift-PWM), the switching power loss of the converter is increased.

Based on the foregoing, a need exists to develop a CHB converter in which the odd-order AC side current harmonics can be controlled to achieve balancing the harmonic spectrums of the DC side current harmonics of the cells that make up the CHB converter, as well as meeting the power quality standards in the AC side. It is with respect to these considers and other that the disclosure herein is presented.

BRIEF SUMMARY

In general, embodiments of the present invention provide methods, apparatus, systems, computing devices, computing entities, and/or the like for controlling DC side current harmonics of a cascaded H-bridge (CHB) converter comprising a plurality of cells. An odd-order current harmonic is injected at an AC side of the CHB converter to control the DC side current harmonics in various embodiments based on an optimization of a constrained optimization problem to achieve at least one of balancing the DC side current harmonics of the plurality of cells and reducing the DC side current harmonics of the plurality of cells. In addition, the optimization may be based on meeting the requirements of Institute of Electrical and Electronic Engineers (IEEE) standard 519. The optimization problem may include a cost function based on switching transitions of the CHB converter and at least one constraint based on, for example, an AC side current harmonic, a maximum demand load current of the CHB converter base on the IEEE standard 519, and a zero-order current harmonic and an hth-order current harmonic for each cell of the plurality of cells for the CHB converter.

For instance, in some embodiments, the odd-order current harmonic is a third order harmonic and the DC side current harmonics is controlled by balancing the zero-order and second-order DC side current harmonics for the plurality of cells of the CHB converter. Here, the balancing may be accomplished in particular embodiments without using DC current sensors. In addition, in particular embodiments, controlling the DC side current harmonics may result in reducing DC link voltage ripples.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 7A:
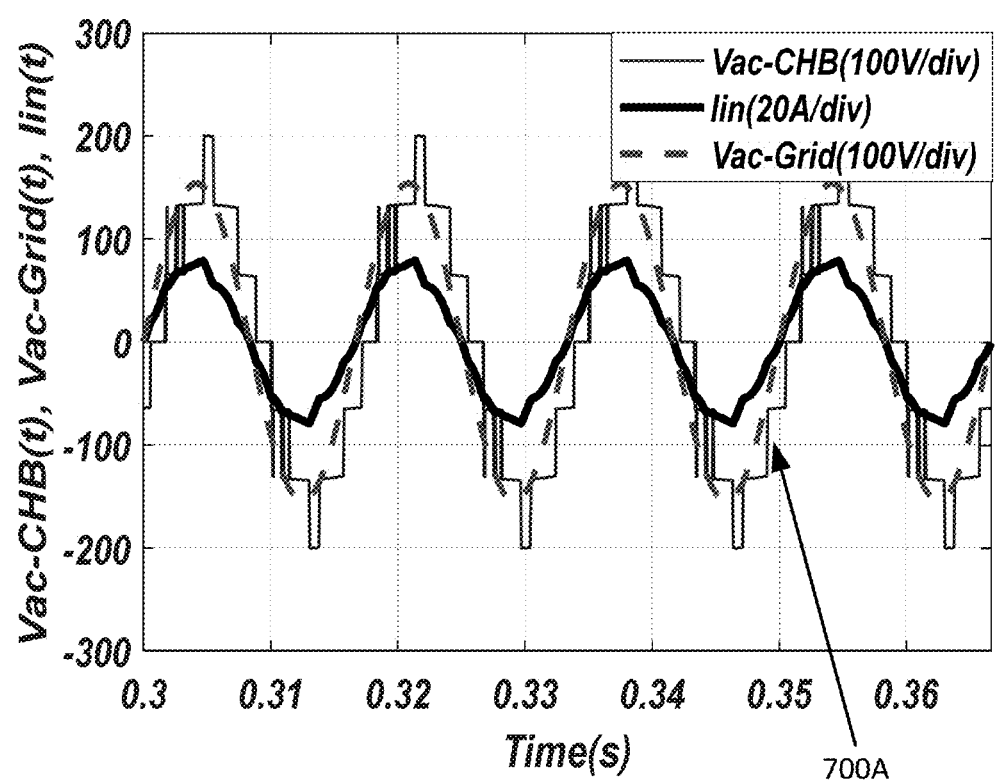
Figure 7B:
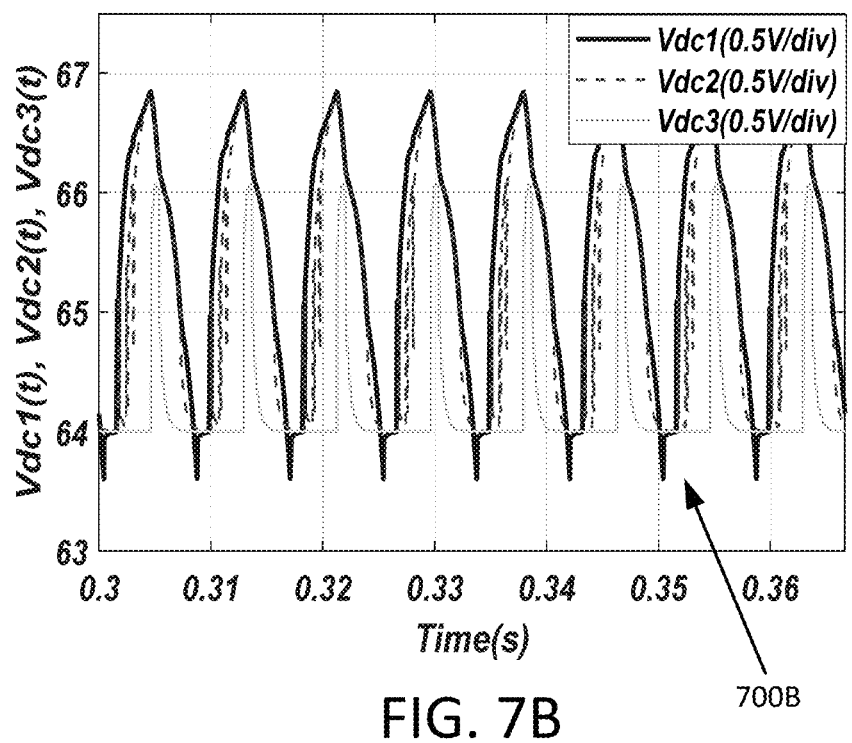
Figure 7C:
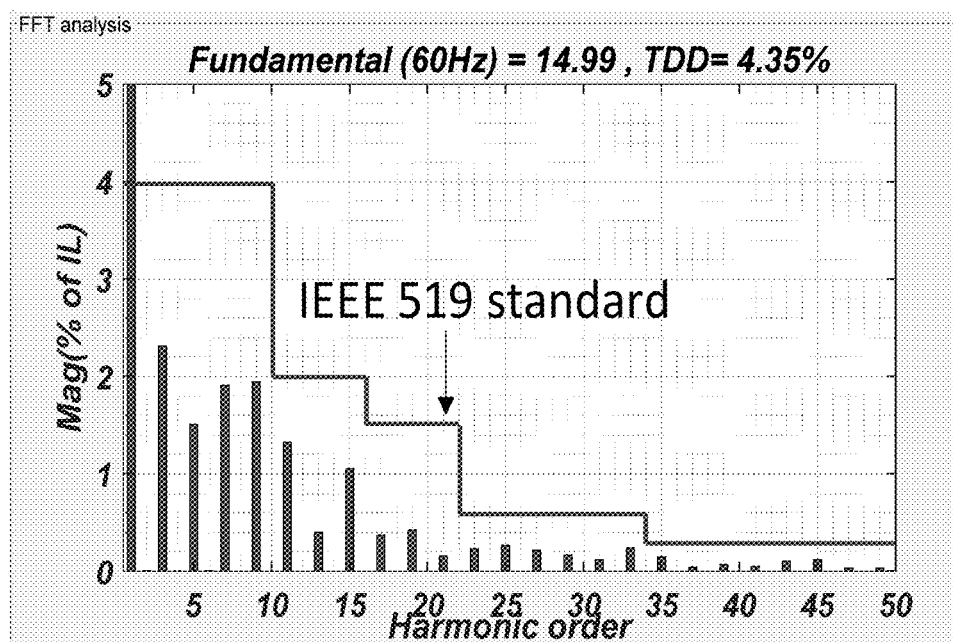
Figure 8A:
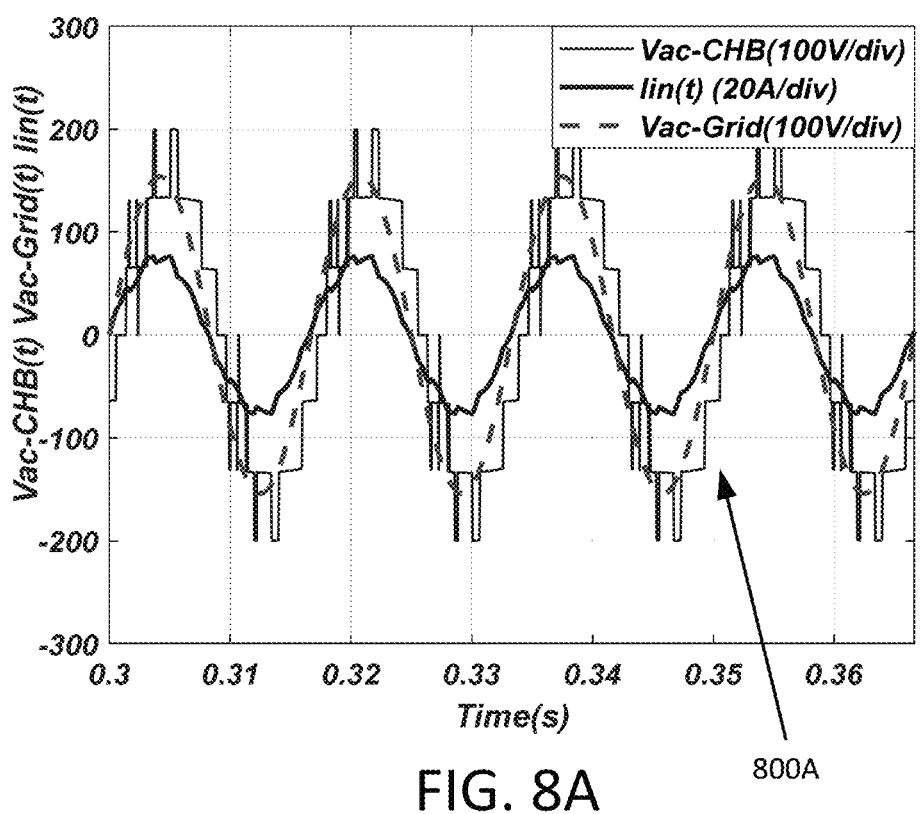
Figure 8B:
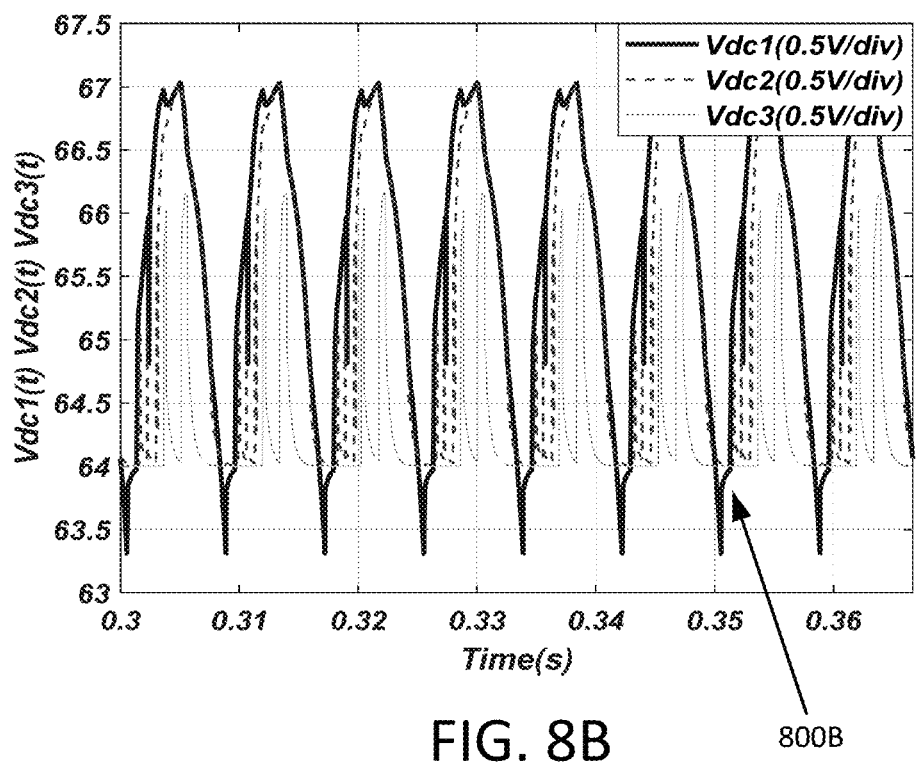
Figure 8C:
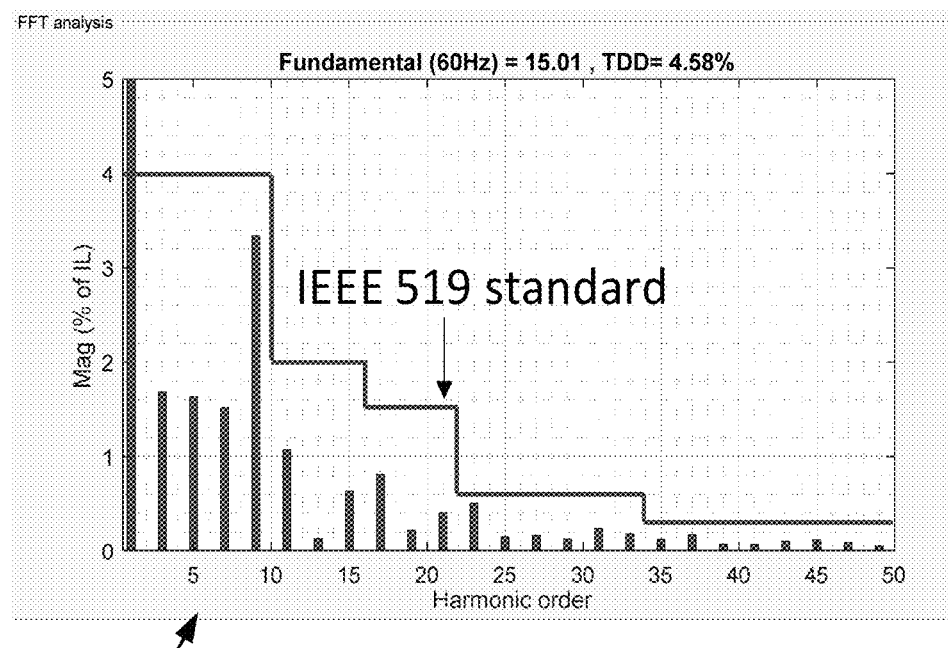
Figure 9:
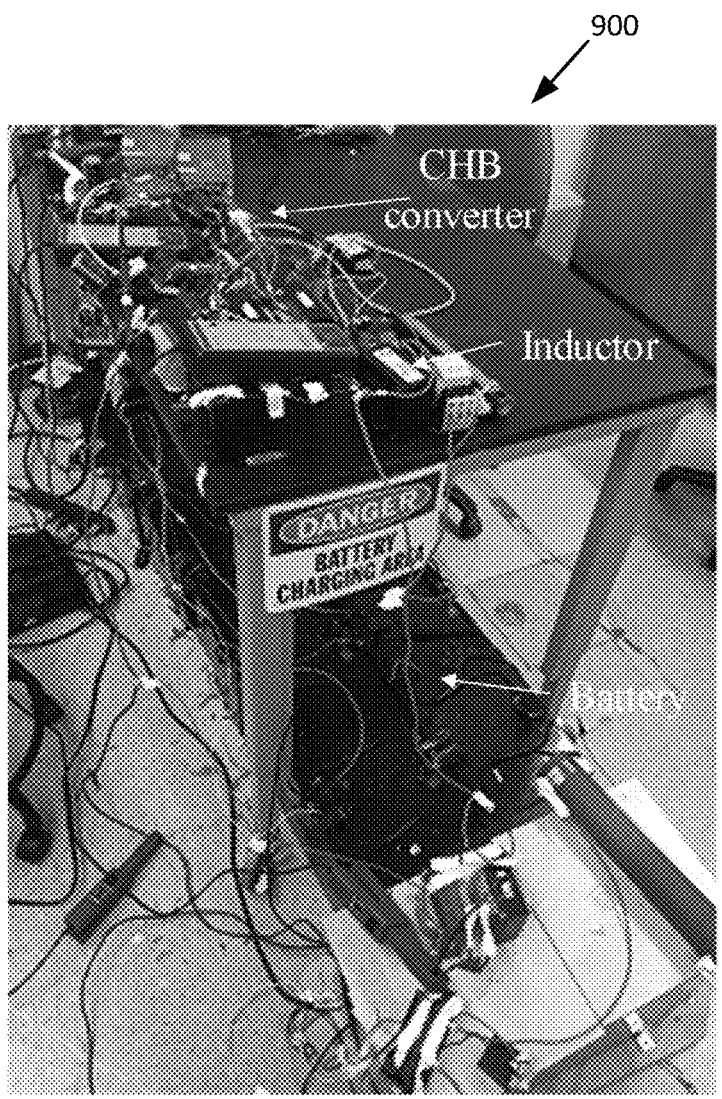
Figure 11A:
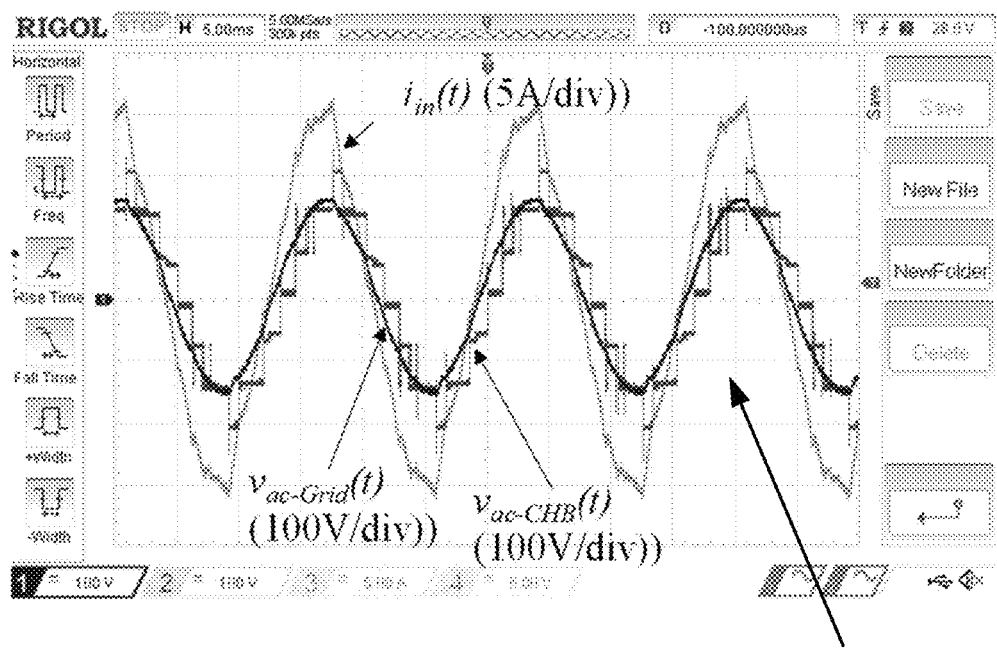
Figure 11B:
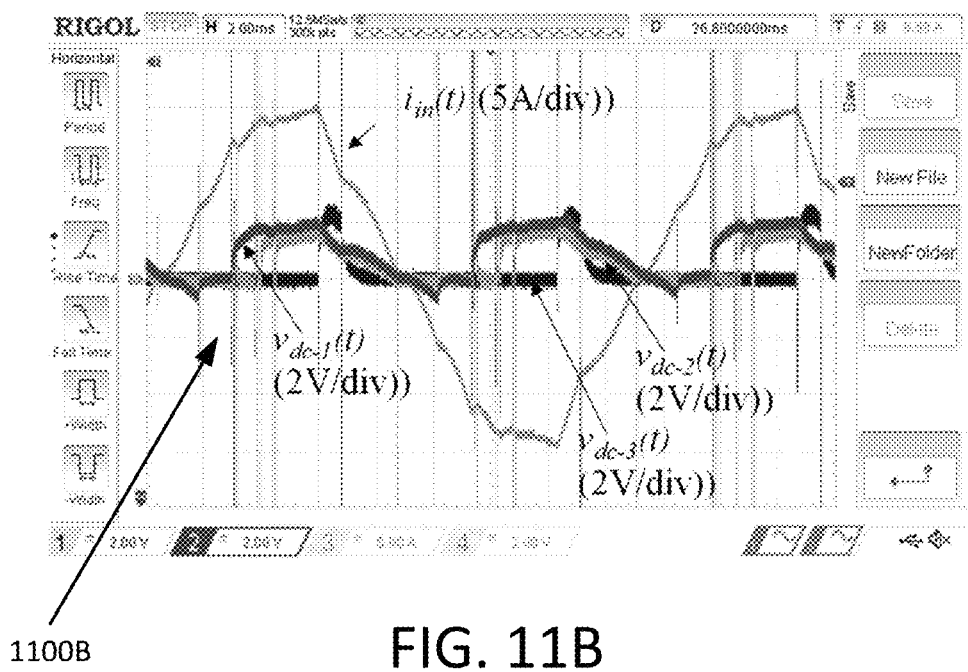
Figure 11C:
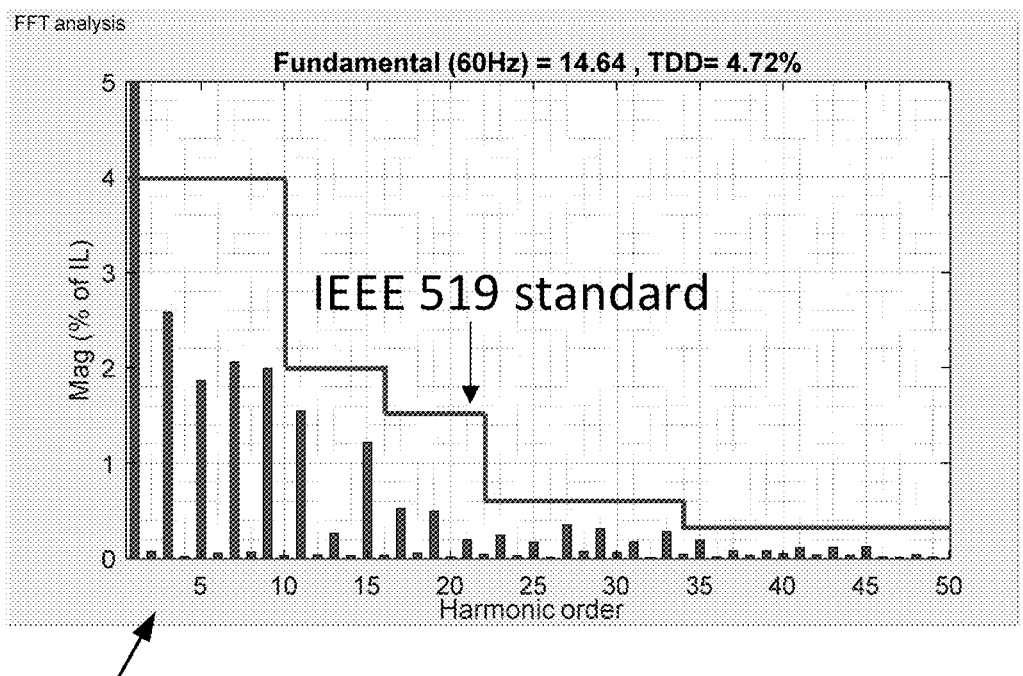
Figure 12A:
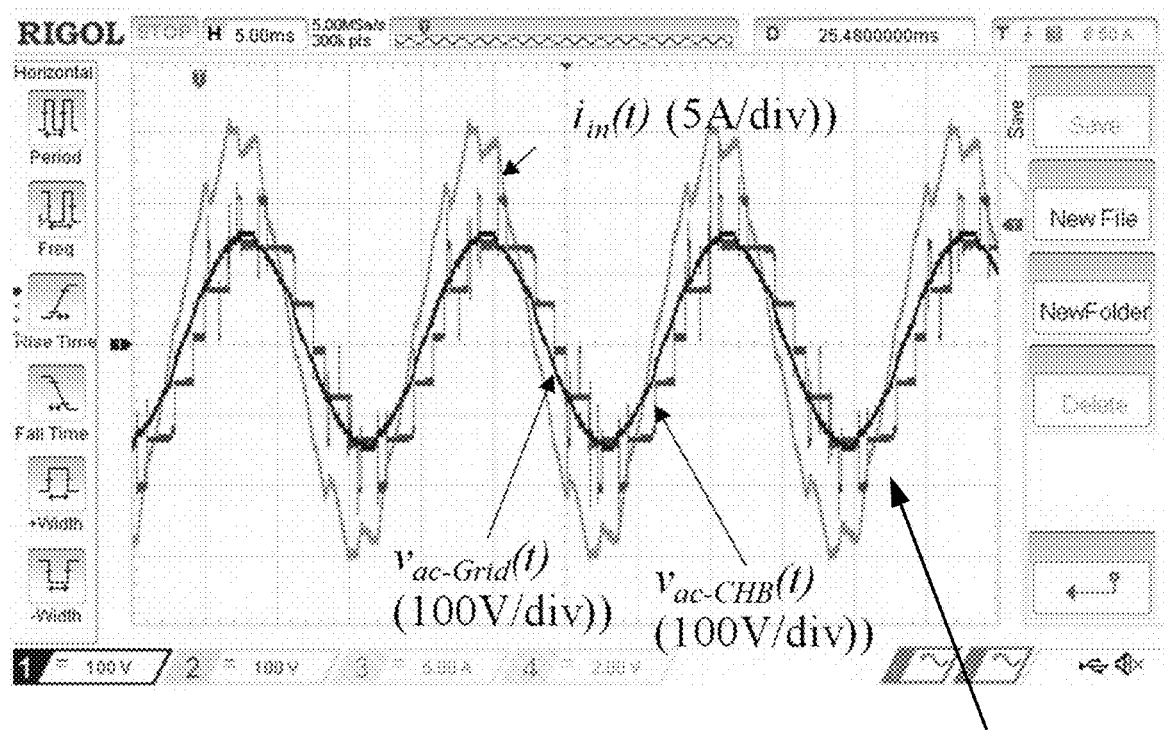
Figure 12B:
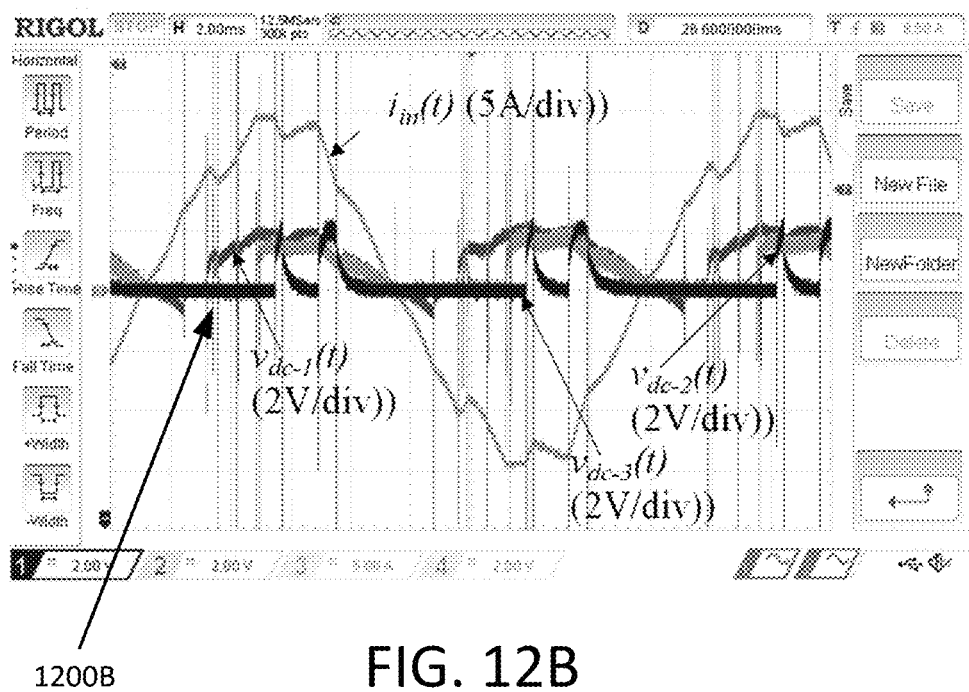
Figure 12C:
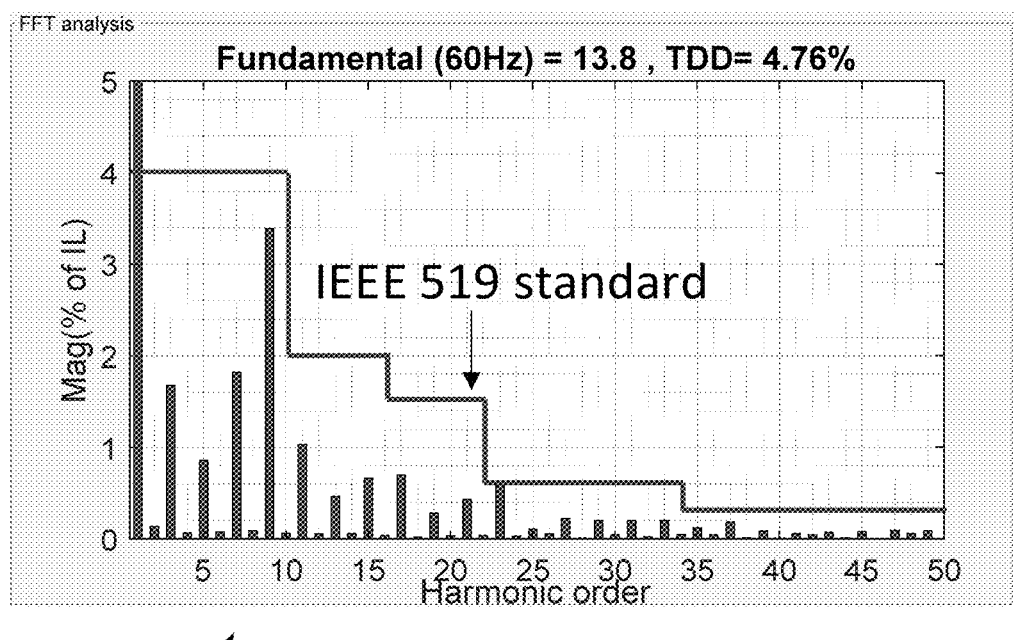

FIGS. 6A-6H provide a comparison of simulation results of a CHB converter with and without balancing the zero and second order harmonic on DC sides in accordance with various embodiments of the invention;

FIGS. 7A-7C provide simulation results of a CHB converter with controlling the voltage ripple on the DC sides by generating the AC side current harmonics in accordance with various embodiments of the invention;

FIGS. 8A-8C provide simulation results of the grid-tied converter without controlling the voltage ripple on the DC sides by generating the AC side current harmonics;

FIG. 9 provides a hardware prototype of a CHB converter used in simulations;

FIGS. 10A-10H provide a comparison of simulation results of grid-tied CHB converter with and without balancing the zero and second order harmonic on DC side in accordance with various embodiments of the invention;

FIGS. 11A-11C provide simulation results of the CHB converter with controlling the voltage ripple on the DC sides by generating the AC side current harmonics in accordance with various embodiments of the invention; and FIGS. 12A-12C provide simulation results of the grid-tied converter without controlling the voltage ripple on the DC sides by generating the AC side current harmonics.

DETAILED DESCRIPTION OF VARIOUS EMBODIMENTS

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. The following brief definitions of terms shall apply throughout the application:

The term "comprising" means including but not limited to, and should be interpreted in the manner it is typically used in the patent context. The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment). If the specification describes something as "exemplary" or an "example," it should be understood that refers to a non-exclusive example; The terms "about" or "approximately" or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Computer Program Products, Systems, Methods, and Computing Entities

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Figure 1:
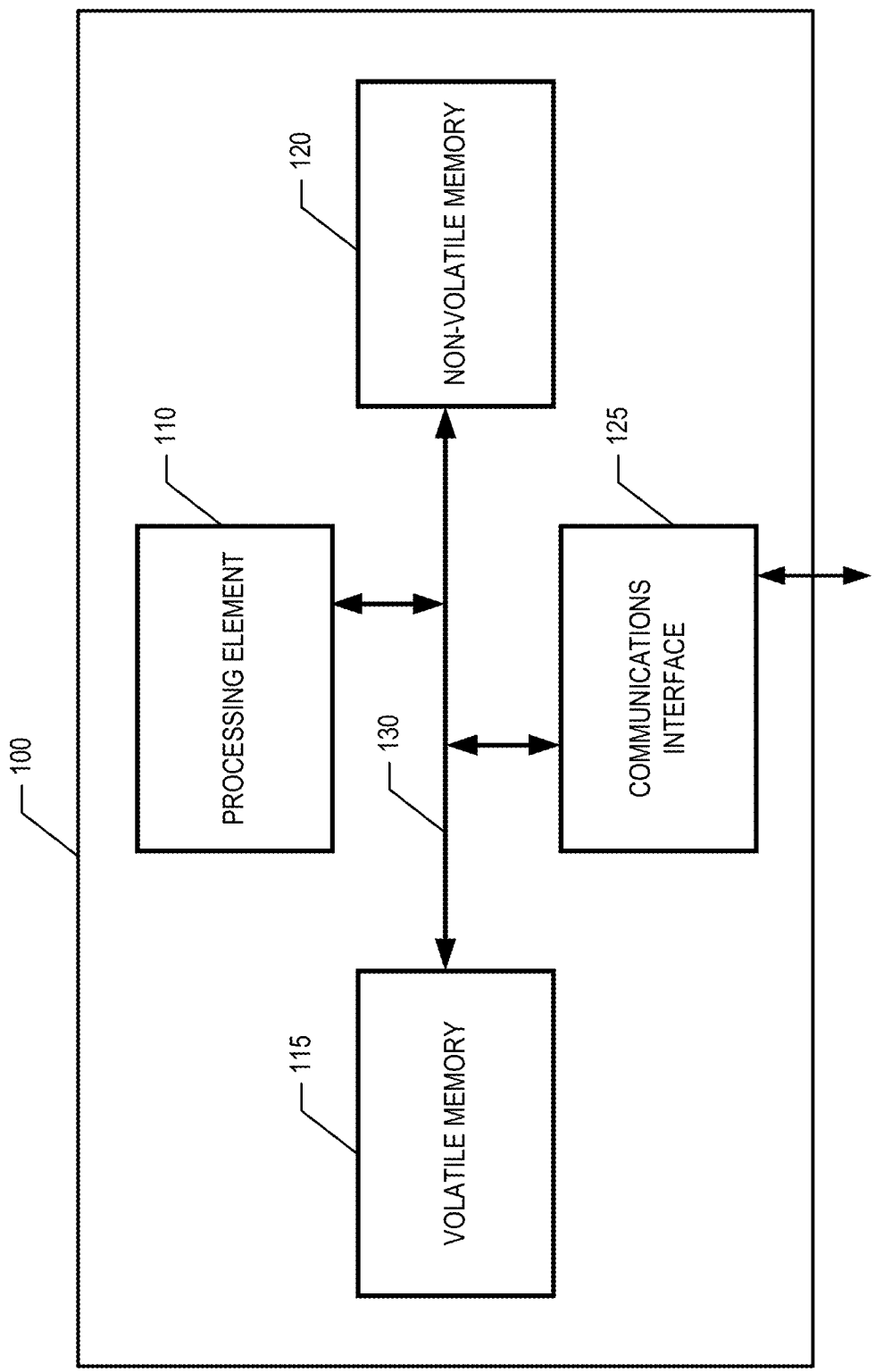
FIG. 1 is a schematic of a computing entity that may be used in accordance with various embodiments of the present invention.

FIG. 1 provides a schematic of a computing entity 100 that may be used in accordance with various embodiments of the present invention. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

Although illustrated as a single computing entity, those of ordinary skill in the art should appreciate that the computing entity 100 shown in FIG. 1 may be embodied as a plurality of computing entities, tools, and/or the like operating collectively to perform one or more processes, methods, and/or steps. As just one non-limiting example, the computing entity 100 may comprise a plurality of individual data tools, each of which may perform specified tasks and/or processes.

Depending on the embodiment, the computing entity 100 may include one or more network and/or communications interfaces 125 for communicating with various computing entities, such as by communicating data, content, information, and/or similar terms used herein interchangeably that can be transmitted, received, operated on, processed, displayed, stored, and/or the like. Thus, in certain embodiments, the computing entity 100 may be configured to receive data from one or more data sources and/or devices as well as receive data indicative of input, for example, from a device.

The networks used for communicating may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks may have any suitable communication range associated therewith and may include, for example, global networks (e.g., the Internet), MANs, WANs, LANs, or PANs. In addition, the networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Accordingly, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 100 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In addition, in various embodiments, the computing entity 100 includes or is in communication with one or more processing elements 110 (also referred to as processors, processing circuitry, and/or similar terms used herein interchangeably) that communicate with other elements within the computing entity 100 via a bus 130, for example, or network connection. As will be understood, the processing element 110 may be embodied in several different ways. For example, the processing element 110 may be embodied as one or more complex programmable logic devices (CPLDs), microprocessors, multi-core processors, coprocessing entities, application-specific instruction-set processors (ASIPs), and/or controllers. Further, the processing element 110 may be embodied as one or more other processing devices or circuitry. The term circuitry may refer to an entirely hardware embodiment or a combination of hardware and computer program products. Thus, the processing element 110 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 110 may be configured for a particular use or configured to execute instructions stored in volatile or non-volatile media or otherwise accessible to the processing element 110. As such, whether configured by hardware, computer program products, or a combination thereof, the processing element 110 may be capable of performing steps or operations according to embodiments of the present invention when configured accordingly.

In various embodiments, the computing entity 100 may include or be in communication with non-volatile media (also referred to as non-volatile storage, memory, memory storage, memory circuitry and/or similar terms used herein interchangeably). For instance, the non-volatile storage or memory may include one or more non-volatile storage or memory media 120 such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media 120 may store files, databases, database instances, database management system entities, images, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

In particular embodiments, the memory media 120 may also be embodied as a data storage device or devices, as a separate database server or servers, or as a combination of data storage devices and separate database servers. Further, in some embodiments, the memory media 120 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. As already discussed, various embodiments contemplated herein use data storage in which some or all the information/data required for various embodiments of the invention may be stored.

In various embodiments, the computing entity 100 may further include or be in communication with volatile media (also referred to as volatile storage, memory, memory storage, memory circuitry and/or similar terms used herein interchangeably). For instance, the volatile storage or memory may also include one or more volatile storage or memory media 115 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media 115 may be used to store at least portions of the databases, database instances, database management system entities, data, images, applications, programs, program modules, scripts, source code, object code, byte code, compiled code, interpreted code, machine code, executable instructions, and/or the like being executed by, for example, the processing element 110. Thus, the databases, database instances, database management system entities, data, images, applications, programs, program modules, scripts, source code, object code, byte code, compiled code, interpreted code, machine code, executable instructions, and/or the like may be used to control certain aspects of the operation of the computing entity 100 with the assistance of the processing element 110 and operating system.

As will be appreciated, one or more of the computing entity's components may be located remotely from other computing entity components, such as in a distributed system. Furthermore, one or more of the components may be aggregated and additional components performing functions described herein may be included in the computing entity 100. Thus, the computing entity 100 can be adapted to accommodate a variety of needs and circumstances.

Exemplary System Operation

The modeling described herein may be carried out on a computing entity such as the one previously described in FIG. 1. Accordingly, the computing entity carries out the modeling as logical operations and these logical operations may be implemented (1) as a sequence of computer implemented acts or one or more program modules running on the computing entity and/or (2) as interconnected machine logic circuits or circuit modules within the computing entity. The implementation is a matter of choice dependent on the performance and other requirements of the computing entity. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Figure 2:
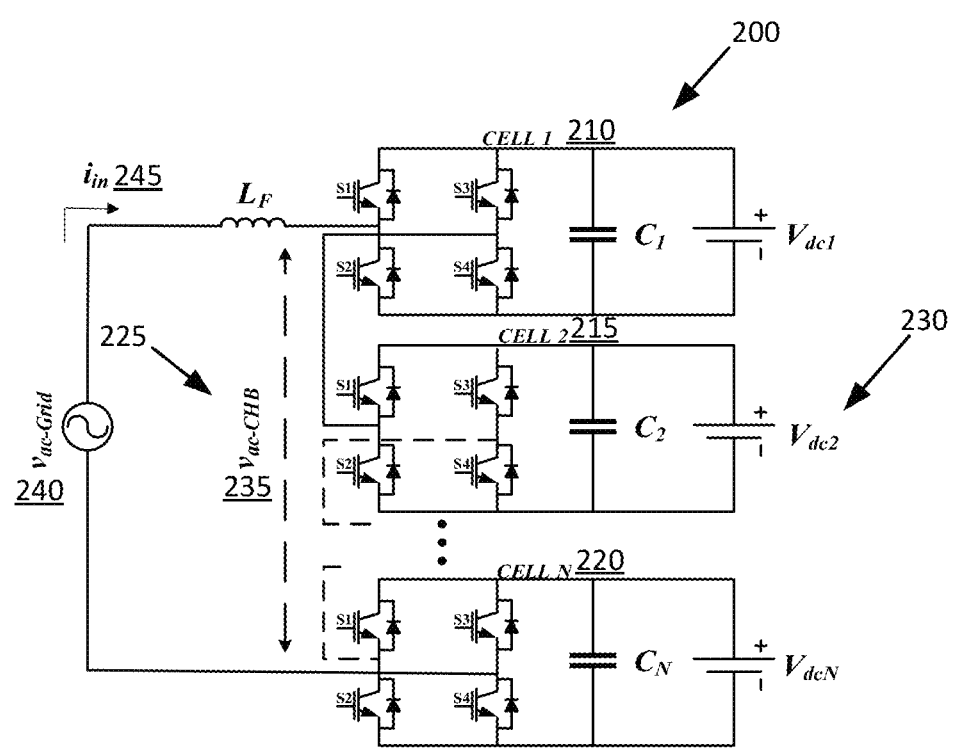
FIG. 2 shows a configuration of a CHB converter that may be used in accordance with various embodiments of the present invention.

Turning now to FIG. 2, the configuration of a CHB convertor 200 that can be modeled in accordance with various embodiments of the invention is shown. Here, the CHB convertor 200 includes N cells (CELL 1 210, CELL 2 215, CELL N 220). Each of the cells 210, 215, 220 has an input AC side 225 and an output DC side 230. Accordingly, the cells 210, 215, 220 are stacked to provide the cascaded voltage $V_{ac\text{-}CHB}$ 235 which then is tied to the AC power grid voltage $V_{ac\text{-}Grid}$ 240 by an AC input current $i_{in}$ 245.

The DC side 230 of each cell 210, 215, 220 of the CHB converter 200 includes four power transistors (S1, S2, S3 and S4), a decoupling DC capacitor ($C_1$, $C_2$, $C_N$), and a DC source such as a battery that outputs a DC voltage ($V_{dc1}$, $V_{dc2}$, $V_{dcN}$). Depending on the embodiment, the CHB converter 200 may be modeled by the controlled-voltage or current sources due to generating the AC CHB voltage on the AC side 225 and generating DC current on each cell 210, 215, 220 of the CHB converter 200. Each of the cells 210, 215, 220 is connected with the next cell 210, 215, 220 in series connection so that the output voltage of the CHB converter 200 is the sum of the output voltages of all the cells 210, 215, 220 in the converter 200.

Figure 3:
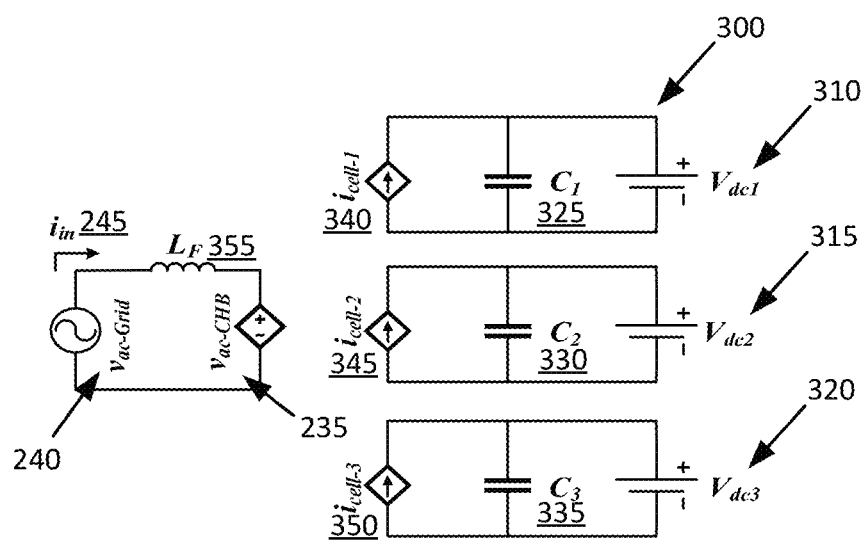
FIG. 3 shows a schematic diagram of an average model of a three-cell CHB converter that may be used in accordance with various embodiments of the present invention.

Briefing turning to FIG. 3, this figure shows average modeling 300 of the CHB converter 200 shown in FIG. 2 that may be used in some embodiments when the number of cells (N) is equal to three. Each of the three cells is terminated at a DC source terminal with a voltage ($V_{dc1}$ 310, $V_{dc2}$ 315, and $V_{dc3}$ 320) which is decoupled by a decoupling capacitor ($C_1$ 325, $C_2$ 330 and $C_3$ 335) from a rectified current source ($i_{cell\text{-}1}$ 340, $i_{cell\text{-}2}$ 345, and $i_{cell\text{-}3}$ 350). The decoupling capacitor helps to decouple the DC power from the harmonic powers on the DC sides of the CHB converter 200. Accordingly, the grid AC voltage source $V_{ac\text{-}Grid}$ 240, the AC input current $i_{in}$ 245, and the rectified DC voltage source $V_{ac\text{-}CHB}$ 235 from the cascaded cells form a loop ($L_F$ 355). This loop 355 is the inductance in the AC circuit to curb the harmonics. As a result, stable and low noise DC source terminal voltages $V_{dc1}$ 310, $V_{dc2}$ 315, and $V_{dc3}$ 320 can be generated from the voltage source ($V_{ac\text{-}CHB}$ 235) of the CHB converter 200. Accordingly, the controlled-voltage source ($V_{ac\text{-}CHB}$ 235) for the CHB converter 200 is controlled by the DC source terminal voltages ($V_{dc1}$ 310, $V_{dc2}$ 320, and $V_{dc3}$ 325) and the switching angles of the CHB converter 200 ($\Theta_1$, $\Theta_2$, ..., $\Theta_{18}$) based on the Fourier series analysis below (Equation 1):

$$v_{ac-CHB}(t) = \sum_{n=1}^{\infty} (a_n \sin(n\omega t) + b_n \cos(n\omega t)),$$

$$\begin{cases} a_n = \frac{2V_b}{\pi n}(\cos(n\theta_1) - \cos(n\theta_2) + \ldots - \cos(n\theta_{18})), \\ b_n = \frac{2V_b}{\pi n}(-\sin(n\theta_1) + \sin(n\theta_2) - \ldots + \sin(n\theta_{18})). \end{cases}$$

Figure 4A:
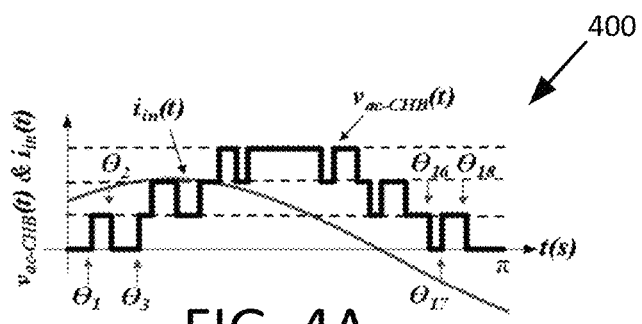
FIG. 4A shows the waveforms of the cascaded voltage and the grid source current according to a three-cell CHB converter.

In Equation 1, $V_{dc1}$ 310, $V_{dc2}$ 315, and $V_{dc3}$ 320 are assumed to be equal to $V_{dc}$. Moreover, a half-wave symmetry is assumed for the periodic waveform 400 as shown in FIG. 4A. Thus, if the first cell of the CHB converter has switchings at $\Theta_1$, $\Theta_2$, $\Theta_3$, $\Theta_{16}$, $\Theta_{17}$, and $\Theta_{18}$, the following equation can be obtained for the AC CHB voltage of the first cell of the converter 200 ($v_{ac\text{-}CHB\text{-}cell1}(t)$) (Equation 2):

$$v_{ac-CHB-cell1}(t) = \sum_{n=1}^{\infty} (a_{n-cell1} \sin(n\omega t) + b_{n-cell1} \cos(n\omega t)),$$

$$\begin{cases} a_{n-cell1} = \frac{2V_b}{\pi n}(\cos(n\theta_1) - \cos(n\theta_2) + \cos(n\theta_3) \\ \qquad - \cos(n\theta_{16}) + \cos(n\theta_{17}) - \cos(n\theta_{18})), \\ b_{n-cell1} = \frac{2V_b}{\pi n}(-\sin(n\theta_1) + \sin(n\theta_2) - \sin(n\theta_3) \\ \qquad + \sin(n\theta_{16}) - \sin(n\theta_{17}) + \sin(n\theta_{18})). \end{cases}$$

Equation 2 can be written for the other cells. These current-controlled sources are functions of the AC time-domain current waveform ($i_{in}(t)$ 245) of the CHB converter 200, the switching angles of the CHB converter ($\Theta_1$, $\Theta_2$, ..., and $\Theta_{18}$), the initial phases of the CHB voltage ($\angle V_{ac\text{-}CHB\text{-}1}$) and the AC input current of the CHB converter ($\angle I_{in\text{-}1}$). If the first cell of the CHB converter 200 has switchings at $\Theta_1$, $\Theta_2$, $\Theta_3$, $\Theta_{16}$, $\Theta_{17}$, and $\Theta_{18}$ when the waveform 400 switches polarity as shown in FIG. 4B, then the following equations can be obtained from the Fourier series of the AC current ($i_{in}(t)$ 245) that flows through the first cell ($i_{cell1\text{-}1}(t)$ 340):

The first of these equations expresses the Fourier series of the AC input current $i_{in}(t)$ 245 that flows through the first cell 210, where n and h are the harmonic orders of the AC input current $i_{in}(t)$ 245 and the DC side current for the first cell 210, respectively. The equation shows all the magnitudes and phases of the harmonics of the AC input current $i_{in}(t)$ 245 in the first cell of the CHB converter 200 (Equation 3):

$$i_{in}(t) = \sum_{n=1}^{\infty} (I_{in-n} \sin(n\omega t + \theta_{in-n})),$$

Figure 4B:
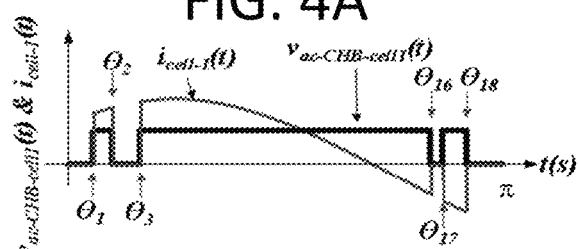
FIG. 4B shows the waveforms of the cascaded voltage and the grid source current in the first cell of a three-cell CHB converter.

The following equation expresses the harmonic terms of the Fourier series of the AC input current $i_{in}(t)$ 245 through the first cell $i_{cell-1}(t)$ 355 in a half-period for a frequency (120 Hz) as shown in FIG. 4B when the switchings of the first cell happen at $\Theta_1$, $\Theta_2$, $\Theta_3$, $\Theta_{16}$, $\Theta_{17}$, and $\Theta_{18}$ (Equation 4):

$$i_{cell-1}(t) = a_{cell1-0} + \sum_{h=1}^{\infty}(a_{cell-1-h}\sin(2h\omega t) + b_{cell-1-h}\cos(2h\omega t)),$$

While the following equation shows the harmonic coefficients of the Fourier series. Here, $a_{cell-1-0}$, $a_{cell-1-h}$, and $b_{cell-1-h}$ are the zero-order, a an b components of the hth-order harmonic of the first cell DC current ($I_{cell-1}(t)$ 340) respectfully. It is assumed that n is an odd-order harmonic and $\Theta_{chb}$, $\Theta_{in-n}$ and $I_{in-n}$ are the initial phase of the CHB voltage, nth-order phase, and current magnitude of the AC input current ($i_{in}(t)$ 245) respectively (Equations 5).

$$a_{cell-1-0} = \sum_{n=1}^{\infty}\left(\frac{-2I_n}{n\pi}(\cos(n(\theta_{CHB}+\theta_{18})+\theta_{in-n}) - \cos(n(\theta_{CHB}+\theta_{17})+\theta_{in-n}) + \ldots - \cos(n(\theta_{CHB}+\theta_1)+\theta_{in-n}))\right),$$

$$a_{cell-1-h} = \sum_{n=1}^{\infty}\left(\frac{-I_n}{\pi}\left(\frac{1}{n+2h}(\cos((n+2h)(\theta_{CHB}+\theta_{18})+\theta_{in-n}) - \cos((n+2h)(\theta_{CHB}+\theta_{17})+\theta_{in-n}) + \ldots - \cos((n+2h)(\theta_{CHB}+\theta_1)+\theta_{in-n})) + \frac{1}{n-2h}(\cos((n-2h)(\theta_{CHB}+\theta_{18})+\theta_{in-n}) - \cos((n-2h)(\theta_{CHB}+\theta_{17})+\theta_{in-n}) + \ldots - \cos((n-2h)(\theta_{CHB}+\theta_1)+\theta_{in-n})\right)\right),$$

$$b_{cell-1-h} = \sum_{n=1}^{\infty}\left(\frac{I_n}{\pi}\left(\frac{1}{n-2h}(\sin((n-2h)(\theta_{CHB}+\theta_{18})+\theta_{in-n}) - \sin((n-2h)(\theta_{CHB}+\theta_{17})+\theta_{in-n}) + \ldots - \sin((n-2h)(\theta_{CHB}+\theta_1)+\theta_{in-n})) - \frac{1}{n+2h}(\sin((n+2h)(\theta_{CHB}+\theta_{18})+\theta_{in-n}) - \sin((n+2h)(\theta_{CHB}+\theta_{17})+\theta_{in-n}) + \ldots - \sin((n+2h)(\theta_{CHB}+\theta_1)+\theta_{in-n})\right)\right),$$

Accordingly, Equations 4 and 5 can be written for the other cells of the CHB converter 200 (Equations 5). When h=1 in Equations 5 (the second-order harmonic in the DC side 230), it is possible to mitigate the DC current harmonics in various embodiments by injecting different current harmonic orders at the AC side 225 of the CHB converter 200. "Injecting" refers to flowing the current (fundamental or harmonics) on the wires. Here, the CHB converter 200 controls the voltage drop of the inductance to generate the desirable fundamental or harmonic current magnitudes.

For example, by injecting the third-order current harmonic at the AC side 225 (n=3) (here, the odd-order harmonics on AC side 225 of the converter can influence the even-order harmonics on DC side 230 of the converter 200) based on Equations 4 and 5, it is possible to reduce the magnitude of the second-order harmonic at the DC side 230.

In addition, AC side current harmonics higher than the third-order (n>3) also can influence the second-order current harmonic at the DC side 230 of the CHB converter 200 in various embodiments. Due to increasing the magnitude of the denominator in Equations 5 by increasing the AC side current harmonic order (n), the influence of the higher order harmonic on the DC side ripple is typically lowered. Moreover, by only controlling the third-order current harmonic at the AC side 225 (n=3), it can become very difficult to eliminate the second-order current harmonic at the DC side 230, and other AC current harmonics can influence the current harmonics. However, Equations 4 and 5 described above can be used in various embodiments to mitigate, and in some instances eliminate, the second-order harmonics at the DC sides 230 of the CHB converter 200. Finally, $a_{cell-1-0}$ also can be controlled by all the AC side current harmonics.

To meet the low harmonics requirements of IEEE 519, an optimization technique is employed in various embodiments involving the following equation set to apply appropriate current harmonics at the AC side 225 to balance the harmonic spectrums of the DC side current harmonics of all cells 210, 215, 220 of the CHB converter 200. The optimization technique (e.g., problem) optimizes the following equation set (Equation Set 6):

$$\min(\cos(\theta_1) - \cos(\theta_2) + \ldots - \cos(\theta_{18}) = M_a,$$
$$-\sin(\theta_1) + \sin(\theta_2) - \ldots + \sin(\theta_{18}) = 0),$$

$$\begin{cases} \text{AC side current} \\ \left|\frac{I_{in-n}}{I_L}\right| = \left|\frac{2V_b\sqrt{(\cos(n\theta_1)-\cos(n\theta_2)+\ldots-\cos(n\theta_{18}))^2 + (\sin(n\theta_1)-\sin(n\theta_2)-\ldots-\sin(n\theta_{18}))^2}}{(\pi n^2\omega L_T)I_L}\right| \leq I_n, \\ \text{for } 3 \leq n \leq 49 \\ \frac{\sqrt{(I_{in-3})^2+(I_{in-5})^2+\ldots+(I_{in-49})^2}}{I_L} \leq l_{TDD}, \\ \text{DC side current} \\ a_{cell-Average} = \frac{1}{3}(a_{cell-1-0} + a_{cell-2-0} + a_{cell-3-0}) \\ |a_{cell-1-0} - a_{cell-Average}| \leq e_0, \\ |a_{cell-2-0} - a_{cell-Average}| \leq e_0, \\ |a_{cell-3-0} - a_{cell-Average}| \leq e_0, \\ I_{cell-Average} = \frac{1}{3}\left(\sqrt{(a_{cell-1-2})^2+(b_{cell-1-2})^2} + \sqrt{(a_{cell-2-2})^2+(b_{cell-2-2})^2} + \sqrt{(a_{cell-3-2})^2+(b_{cell-3-2})^2}\right) \\ \left|\sqrt{(a_{cell-1-2})^2+(b_{cell-1-2})^2} - I_{cell-Aerage}\right| \leq e_2, \\ \left|\sqrt{(a_{cell-2-2})^2+(b_{cell-2-2})^2} - I_{cell-Aerage}\right| \leq e_2, \\ \left|\sqrt{(a_{cell-3-2})^2+(b_{cell-3-2})^2} - I_{cell-Aerage}\right| \leq e_2. \end{cases}$$

where $I_L$ is the maximum demand load current of the CHB converter 200 based on the IEEE 519 standard as shown in Table I below. $1_n$ and $1_{TDD}$ are the current harmonic and TDD limits of the IEEE 519 standard when $I_L/I_{SC}$<20 ($I_{SC}$ is the short circuit current at the PCC). $e_0$ and $e_2$ are the errors of the zero and second-order harmonics of the DC currents for all cells 210, 215, 220 of the CHB converter 200. Here, just the zero and second-order harmonics are controlled in the equation set. However, it is possible in various embodiments to control higher than the second-order harmonic with the modeling in Equations 3-5. $M_a$ is the modulation index of the CHB converter 200. Depending on the embodiment, different optimization techniques may be used to solve the equation set. For instance, in particular embodiments, the particle swarm optimization technique is used to solve Equation Set 6.

Accordingly, the industry has published a set of required demand load harmonic limits as the standard known as IEEE 519. Table 1 lists the requirements from the IEEE 519 standard for harmonics from 3 to 50, including the total demand distortion (TDD).

TABLE 1

Harmonic limits of IEEE

| Harmonic-order | Limits |
| --- | --- |
| 3 ≤ n < 11 | 4% |
| 11 ≤ n < 17 | 2% |
| 17 ≤ n < 23 | 1.5% |
| 23 ≤ n < 35 | 0.6% |
| 35 ≤ n ≤ 50 | 0.3% |
| TDD | 5% |

Figure 5:
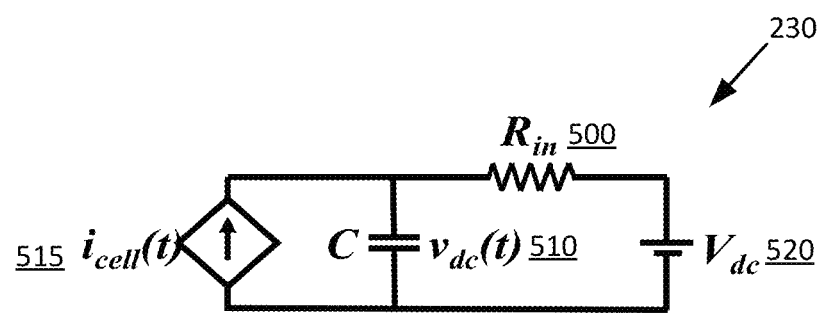
FIG. 5 shows a model of a DC side of a grid-tied converter that may be used in accordance with various embodiments of the invention.

Further, in various embodiments, the DC link voltage ripples of the CHB converter 200 are lowered. FIG. 5 shows the DC side 230 of the CHB converter 200 when the model is simplified by replacing an internal resistance $R_{in}$ 500. The $v_{dc}(t)$ 510 can be calculated by the superposition theory when the sources $i_{cell}(t)$ 515 and $V_{dc}$ 520 are used as shown in the figure. The $i_{cell}(t)$ 515 includes all even-order current harmonics, which can be calculated by Equation 5 (Equation 7):

$$v_{dc}(t) = V_{dc} + \sum_{h=2}^{\infty} \frac{R_{in}A_h}{1+(h\omega R_{in}C)^2} \begin{pmatrix} \sin(h\omega t + \theta_h) \\ -h\omega R_{in}C\cos(h\omega t + \theta_h) \end{pmatrix},$$

where $A_h$ and $\Theta_h$ are the magnitude and phase of the hth-order current harmonic of the CHB converter 200, respectively. The DC side voltage harmonics of the CHB converter 200 can be derived as shown below (Equation 8).

$$v_{dc-h}(t) = \sum_{h=2}^{\infty} \frac{R_{in}A_h}{(1+(h\omega R_{in}C)^2)}(\sin(h\omega t + \theta_h) - h\omega R_{in}C\cos(h\omega t + \theta_h)),$$

The voltage ripple in the worst scenario is lower than the following equation which is derived from Equation 8 by taking the first and second-order derivatives and assumptions that the peaks and valleys of the ripples have the same magnitudes (Equation 9):

$$V_{ripple-worst} \approx \sum_{h=2}^{\infty} \frac{2R_{in}A_h}{V_{dc}\sqrt{1+(h\omega R_{in}C)^2}}$$

As can be seen in Equation 9, by using a higher capacitor (C) in various embodiments, the magnitude of the DC link voltage ripples can be reduced.

Simulation and Experimental Results

Figure 6A:
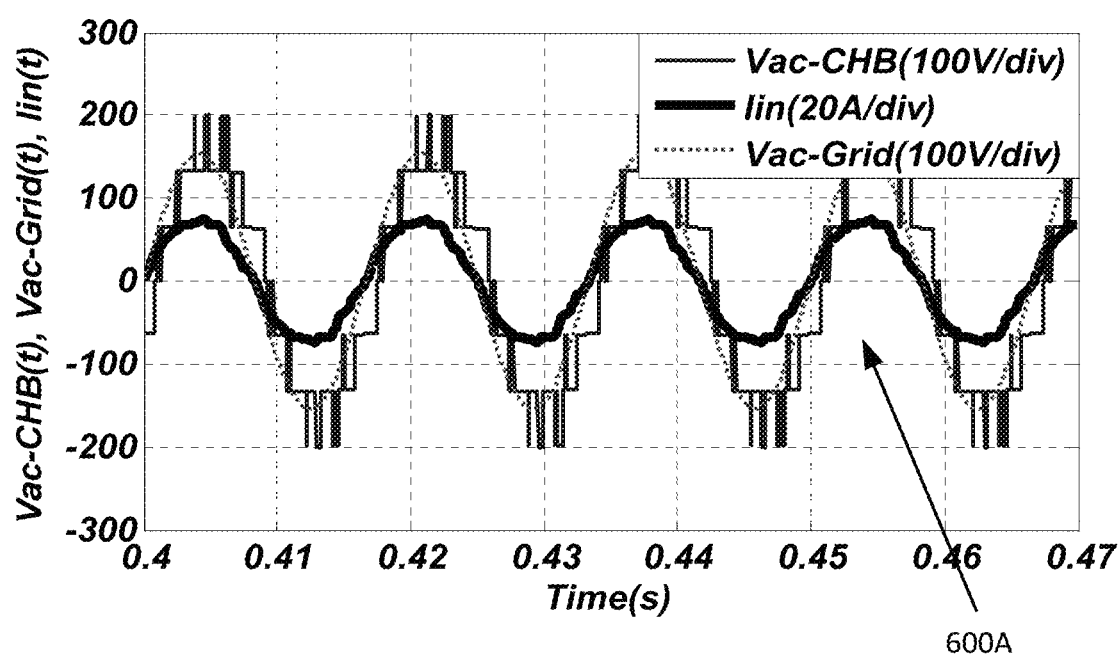
Figure 6B:
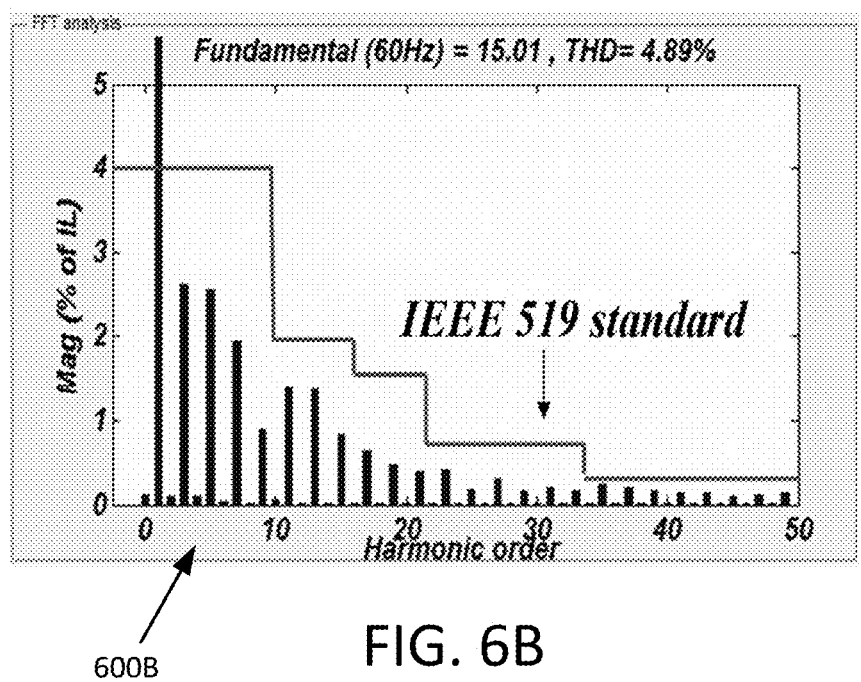
Figure 6C:
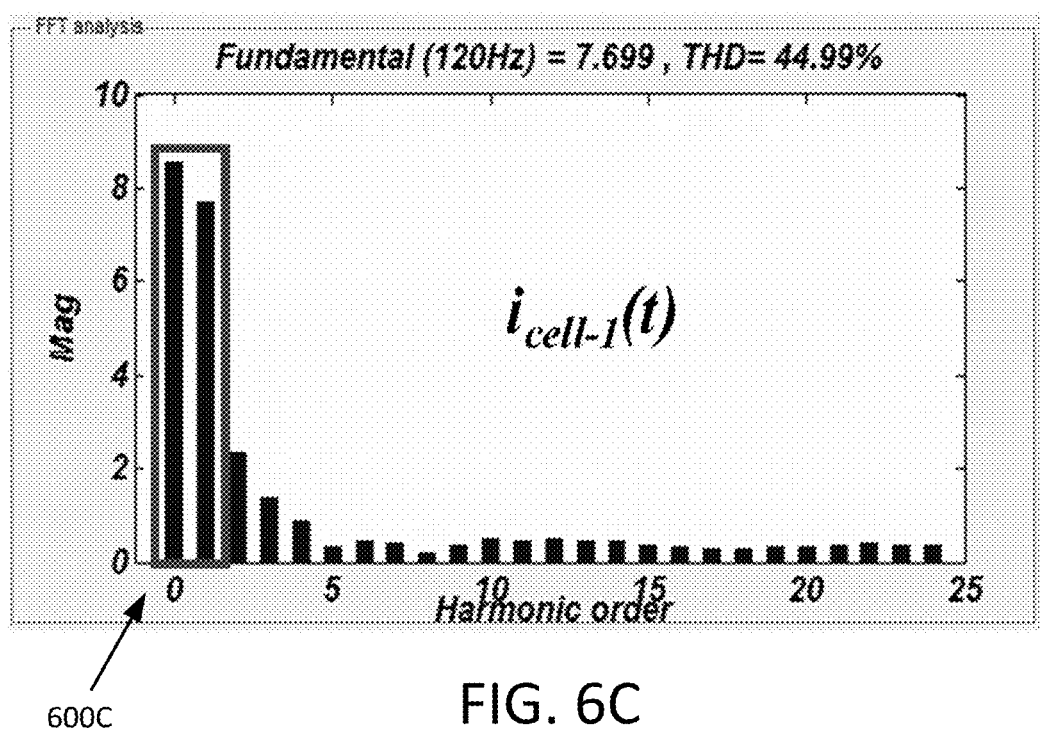
Figure 6D:
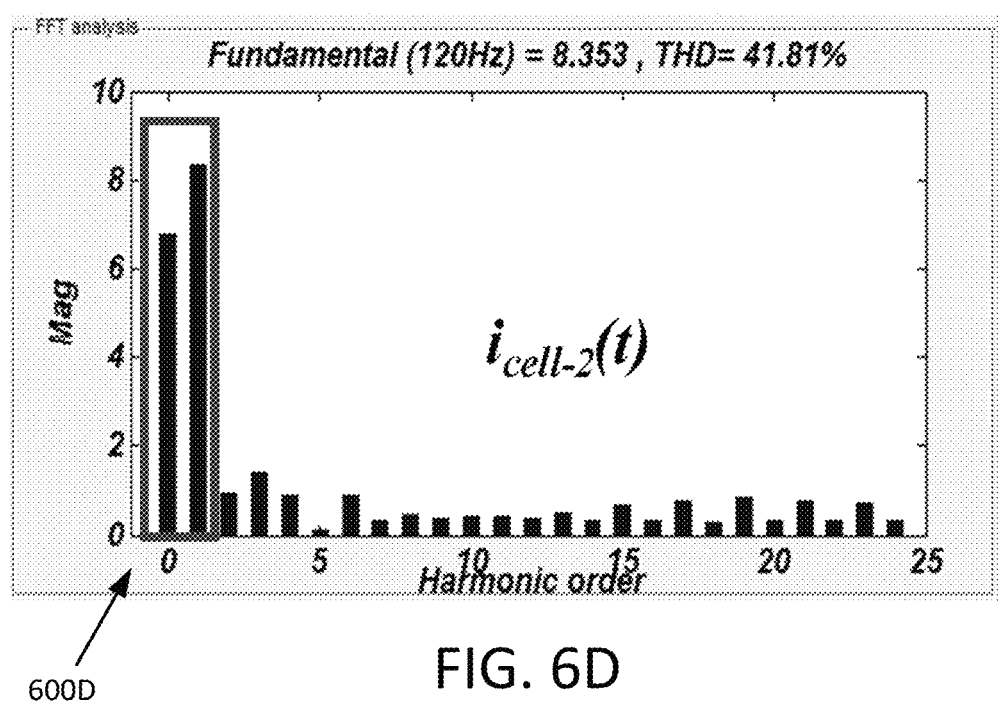
Figure 6E:
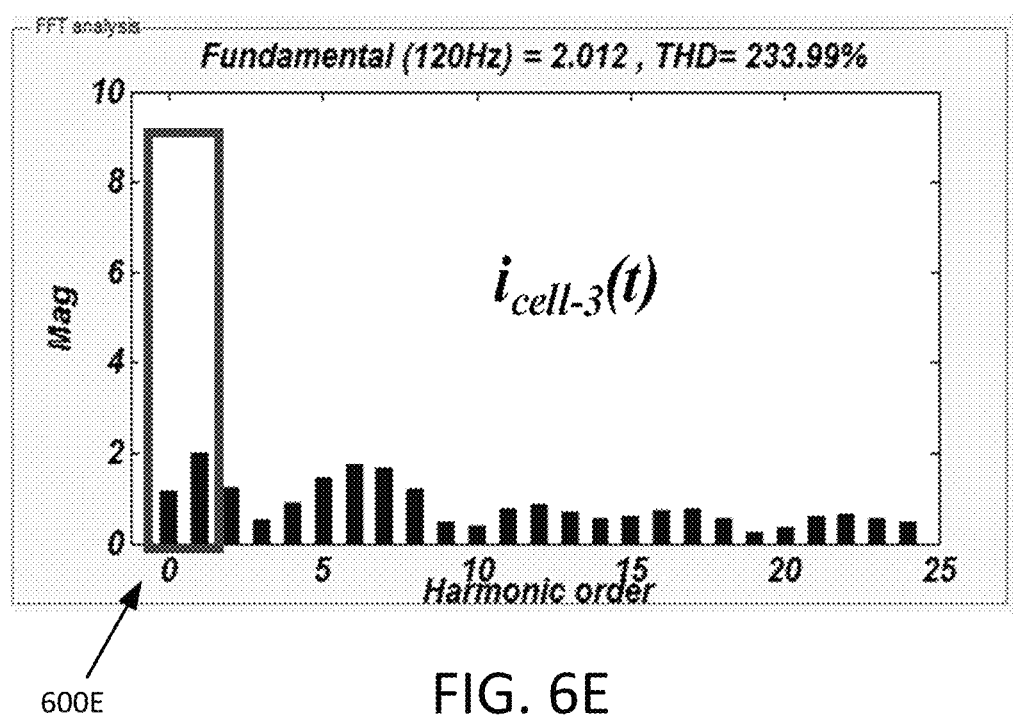
Figure 6F:
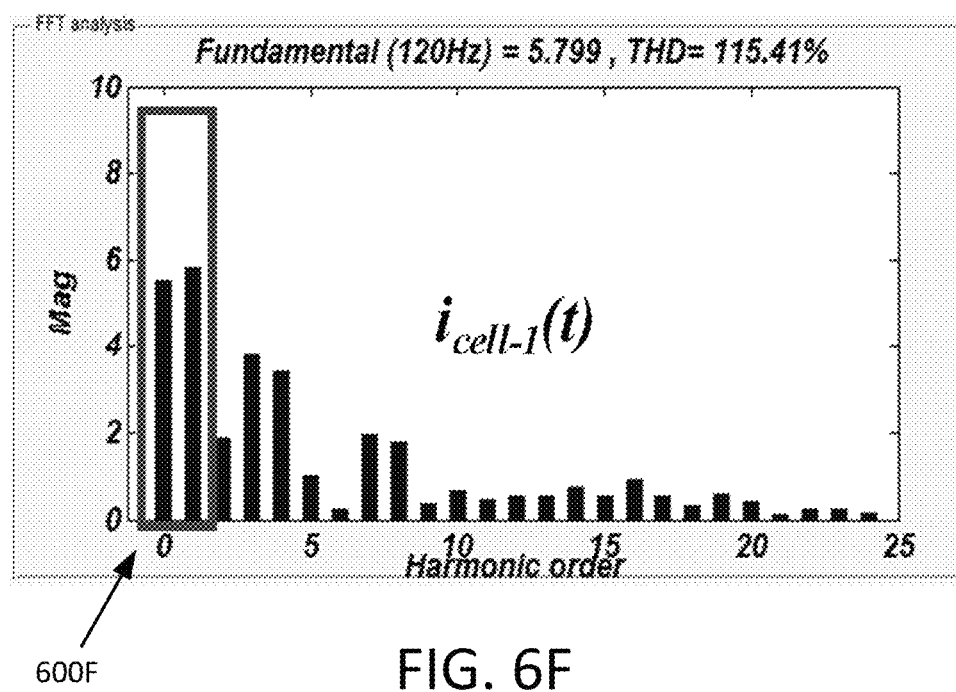
Figure 6G:
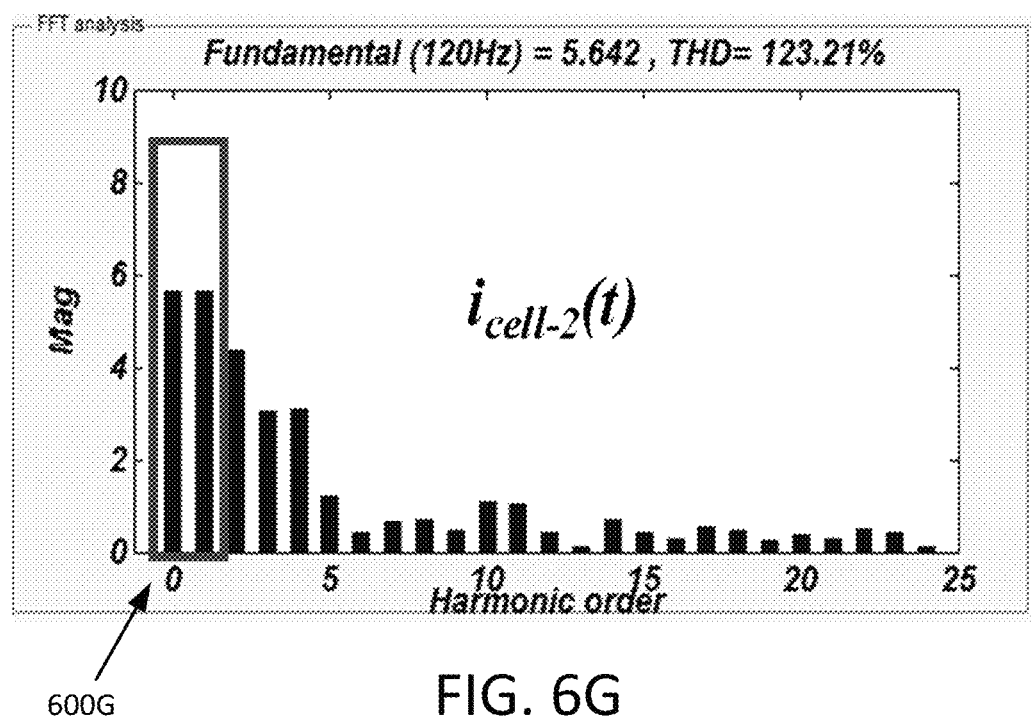
Figure 6H:
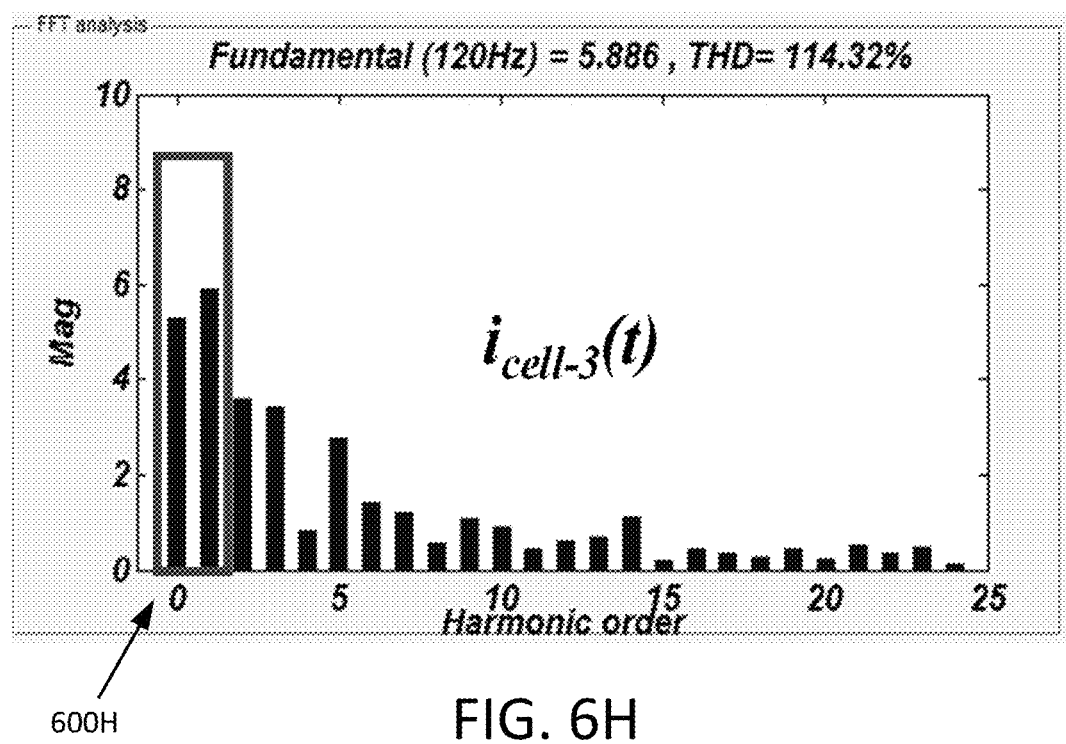

Validation of various advantages of embodiments of the invention to control the harmonics of the AC and DC sides of a CHB converter without using any DC current sensors have been shown through simulation and experimental results comparing the DC current harmonics of a 3-cell CHB converter with and without controlling DC side current harmonics according to embodiments of the invention. In addition, experimental results show that by injecting the third order current harmonic, the DC link voltage ripple can be reduced with low switching frequency. MATLAB Simulink is used to simulate controlling DC side current harmonics according to various embodiments of the invention. The parameters of the grid-tied converter are $V_{dc}$=65V, $I_L$(RMS)=14.14 A, $V_{ac-Grid}$=110 V, ω=2π60 rad/S, $L_T$=0.485 pu, and each cell of the CHB converter has 5 Lead-Acid batteries (12V, 75 Ah, and maximum charging voltage 14.8V). The operating point of the CHB converter is $I_{in-1}$=15 A, $I_{in-3}$=0.6 A, and the phase of $I_{in-1}$ is in the same phase of the fundamental grid voltage. The simulation results shown in FIGS. 6A-6H compare the harmonic spectrums of the DC harmonics of the grid-tied converter with and without balancing the zero and second order harmonics. FIG. 6A shows the time-domain waveforms 600A of the CHB converter without balancing the DC harmonics. FIG. 6B shows the AC current harmonic 600B of the CHB converter. The result of the AC current harmonics 600B in FIG. 6B is similar for both with and without balancing of the zero and second-order harmonic at the DC side. FIGS. 6C, 6D, and 6E show the current harmonics of the DC side current harmonics 600C, 600D, 600E without balancing the zero and the second-order current harmonics. As shown in these figures, without balancing the DC link current harmonics 600C, 600D, 600E, the first and second cells (shown in FIGS. 6C-6D) have huge zero and second-order current harmonics (around 7-8%). However, the third cell (shown in FIG. 6E) has low zero and second-order current harmonic (around 1-2%). The experimental results of implementing various embodiments of the invention are shown in FIGS. 6F, 6G, and 6H. As shown, all of the zero and second-order harmonics 600F, 600G, 600H of the first, second, and third cells are close to each other. However, small variations which can be seen in the magnitudes of DC link current harmonics are due to just controlling the fundamental and third-order current harmonics of the AC side of the CHB converter in (3-5). So these small variations can be reduced by controlling a higher number of AC current harmonics of the CHB converter.

The second simulation results provided in FIGS. 7A-7C and 8A-8C show how to reduce the DC side ripples by controlling the AC side harmonics in CHB converters. FIGS. 7A-7C and 8A-8C compare the DC link voltage ripples of the CHB converter with and without using the AC side harmonics ($i_{in-1}(t)$, $i_{in-5}(t)$, ...) based on various embodiments of the invention respectively. FIG. 7A shows the time-domain waveforms of $v_{ac-CHB}(t)$, $v_{ac-Grid}(t)$ and $i_{in}(t)$ 700A when the maximum fundamental current is 15 A and the odd order current harmonics are controlled to reduce the second order DC link voltage harmonics. The time-domain waveforms of the $v_{dc1}(t)$, $v_{dc2}(t)$ and $v_{dc3}(t)$ 700B are shown in FIG. 7B for the case that the second order DC link voltage harmonics are controlled. FIG. 7C shows that the current harmonics 700C meet the requirements of the IEEE-519 for both harmonics and TDD. FIG. 8A shows the time-domain waveforms of $v_{ac-CHB}(t)$, $v_{ac-Grid}(t)$ and $i_{in}(t)$ 800A when the maximum fundamental current is 15 A and the odd order current harmonics are not controlled to reduce the second-order DC link voltage harmonic. The time-domain waveforms of the $v_{dc1}(t)$, $v_{dc2}(t)$ and $v_{dc3}(t)$ 800B are shown in FIG. 8B for the case that the second-order DC link voltage harmonic is high. As measured, DC link voltage ripples when the odd-order current harmonics are not used to reduce the DC link voltage ripples are 13.2% higher than the DC link voltage ripples in FIG. 7C. FIG. 8C shows that the current harmonics 800C meet the requirements of the IEEE-519 for both harmonics and TDD.

Figure 10A:
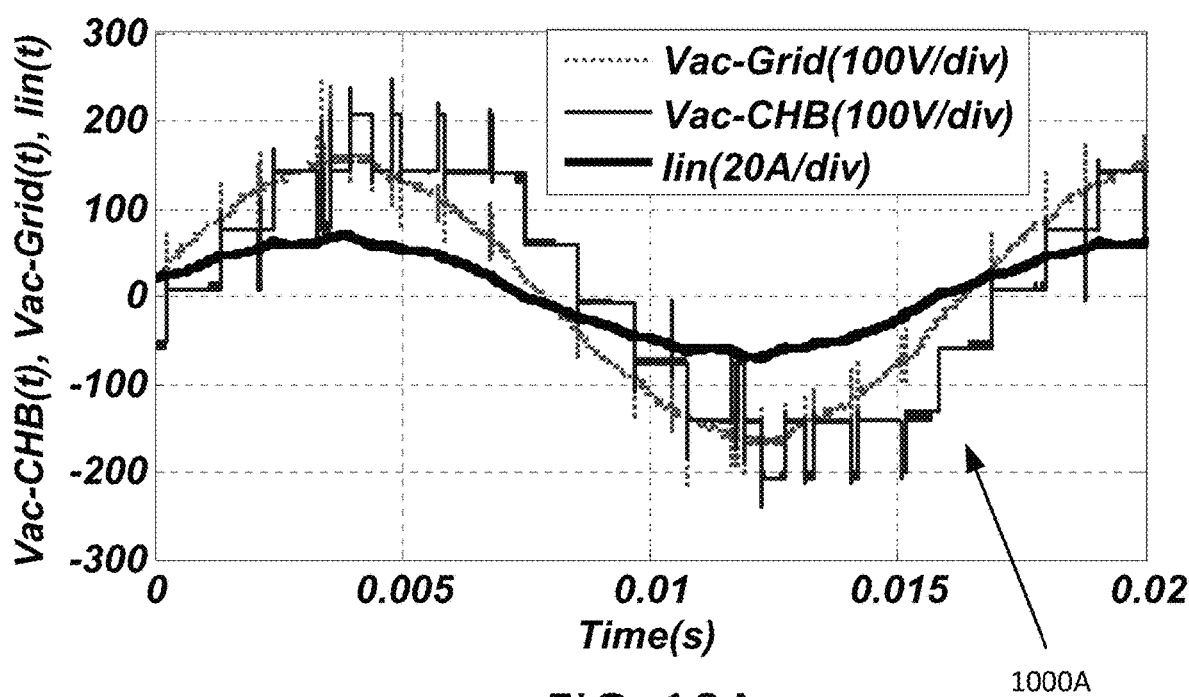
Figure 10B:
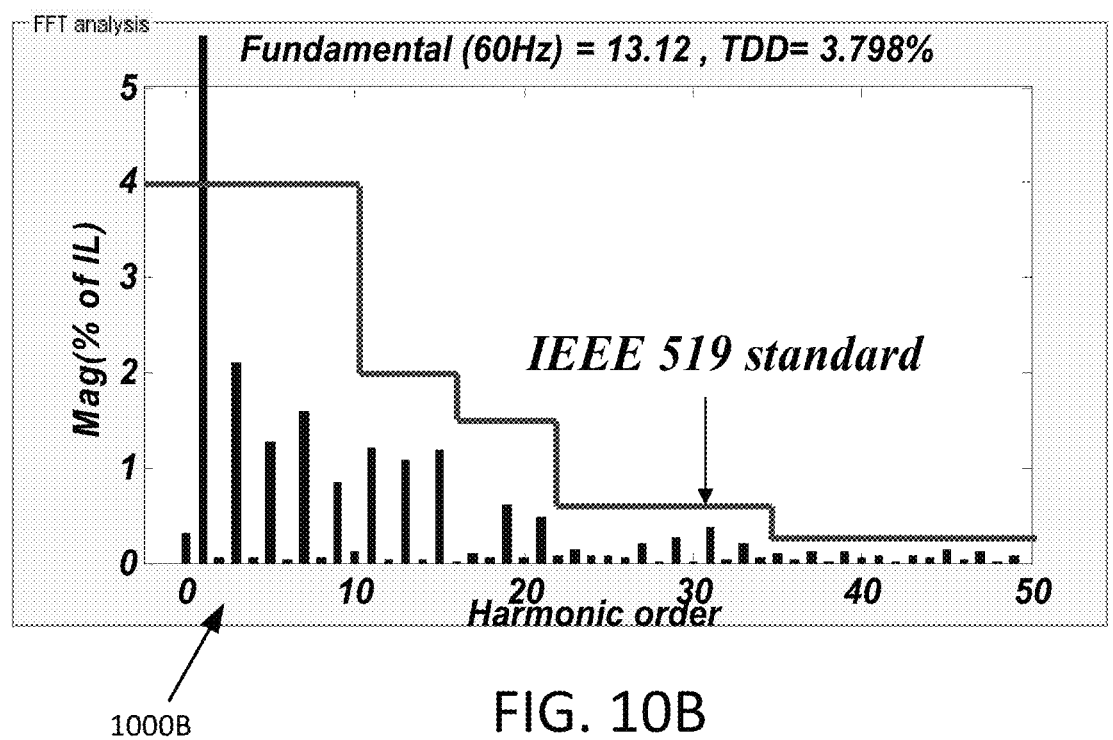
Figure 10C:
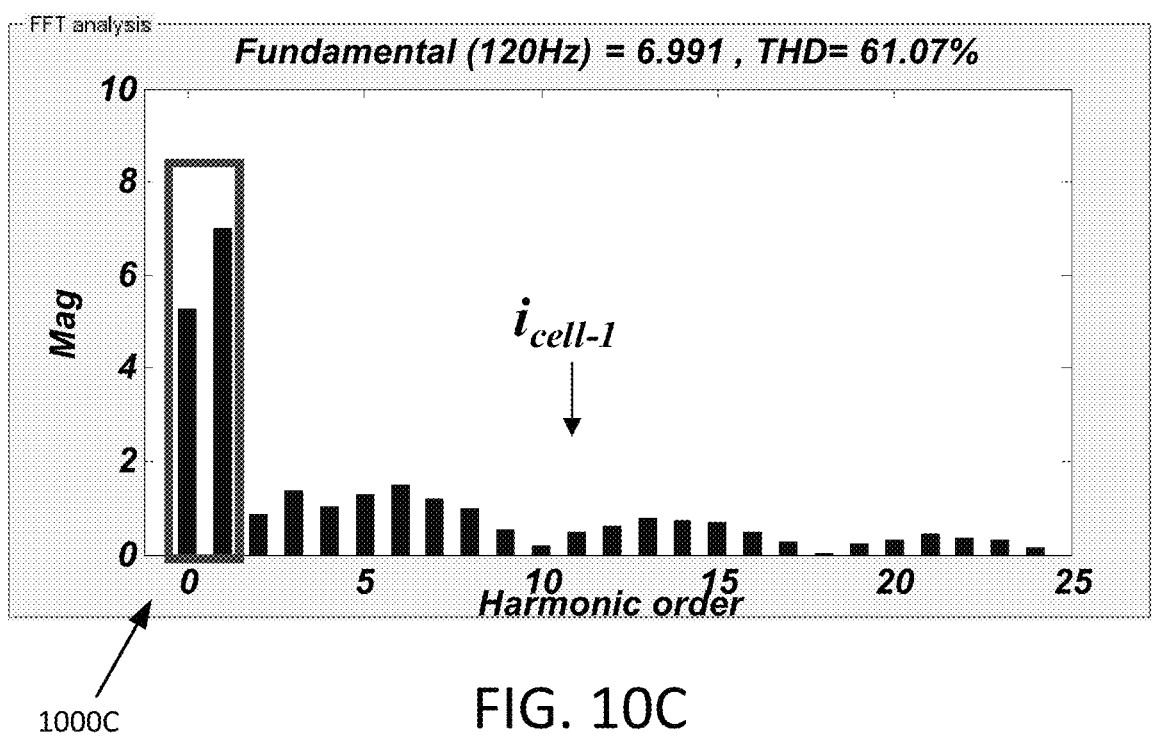
Figure 10D:
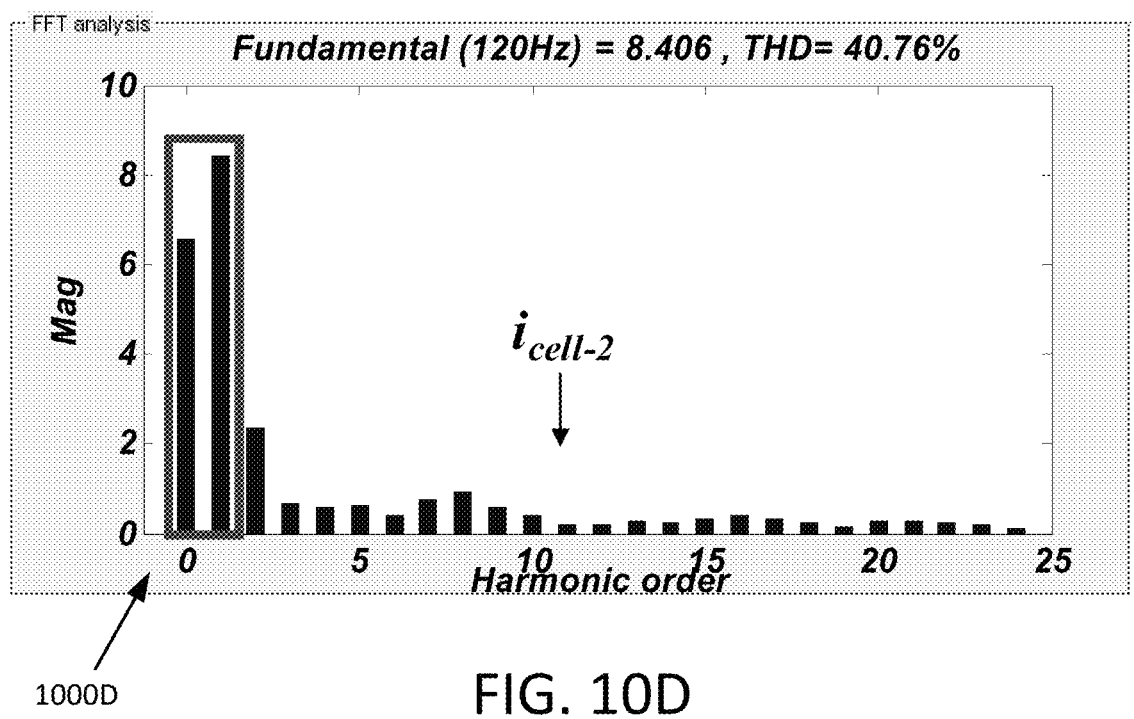
Figure 10E:
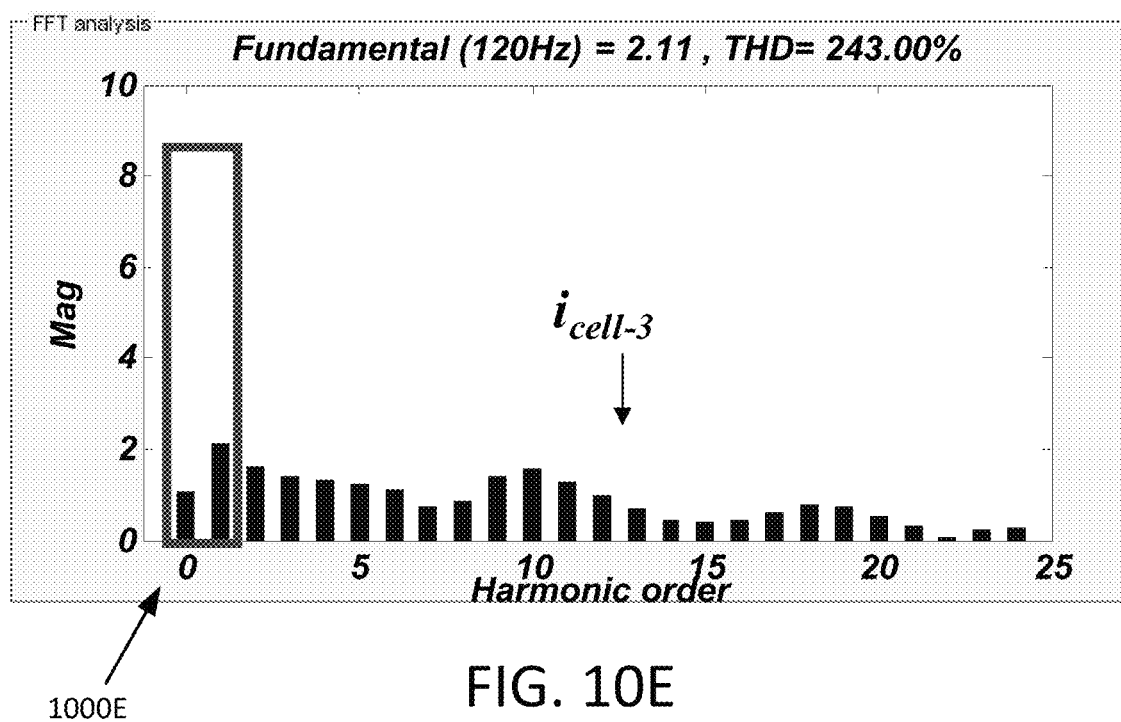
Figure 10F:
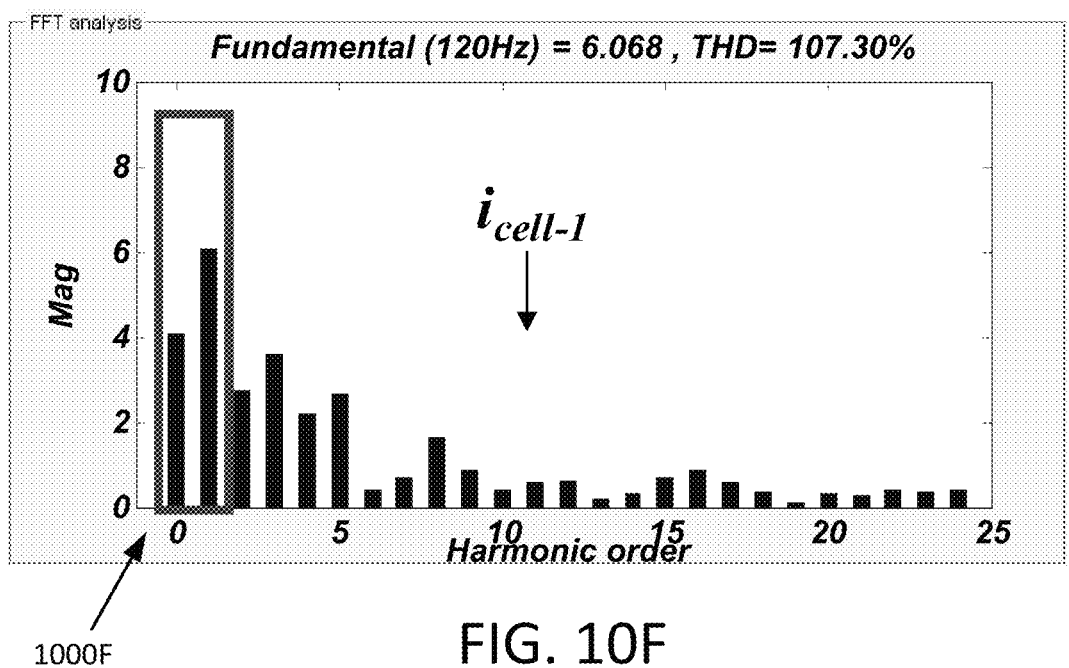
Figure 10G:
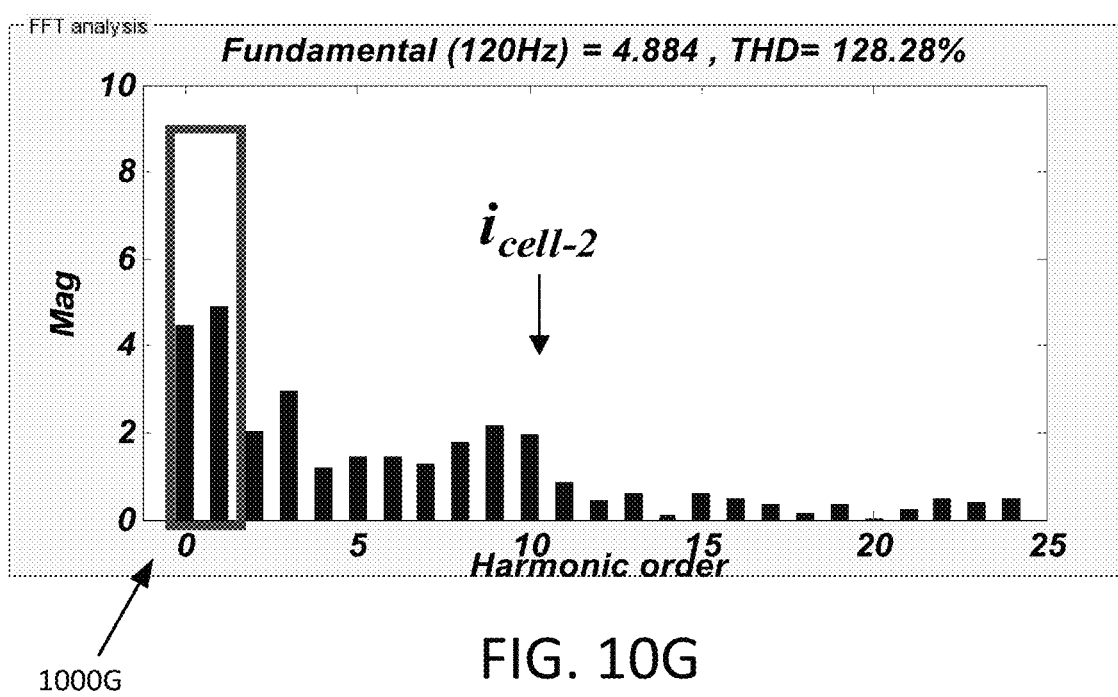
Figure 10H:
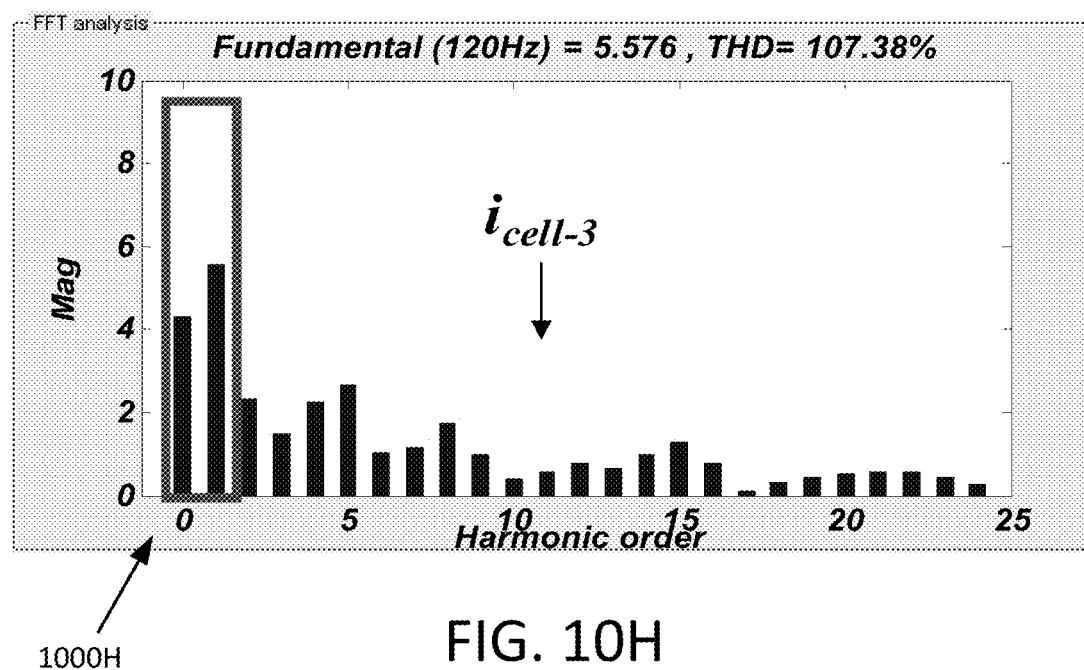

The hardware prototype of the 3-cell CHB converter 900 used in the experiments is shown in FIG. 9. The experimental results shown in FIGS. 10A-10H compare the harmonics of the DC sides of the CHB converters with and without balancing the zero and second-order harmonics. FIG. 10A shows the time-domain waveforms 1000A of the CHB converters without balancing the DC harmonics. FIG. 10B shows the AC current harmonic 1000B of the CHB converter. The result of the AC current harmonics 1000B in FIG. 10B is similar for both with and without balancing of the zero and second-order harmonics on the DC side. FIGS. 10C, 10D, and 10E show the current harmonic spectrums of the DC side current harmonics 1000C, 1000D, 1000E without balancing the zero and second-order current harmonics. As shown in these figures without balancing the DC link current harmonics, the first and the second cells (shown in FIGS. 10C-10D) have huge zero and second-order current harmonics (around 5-9%). However, the third cell (shown in FIG. 10E) has low zero and second-order current harmonics (around 1-2%) similar to the simulation results. The experimental results of implementing various embodiments of the invention are shown in FIGS. 10F, 10G, and 10H. As shown, all of the zero and second-order harmonics 1000F, 1000G, 1000H of the first, second, and third cells are close to each other. However, small variations also can be seen as similar to the simulation results in FIGS. 6A-6H.

Advantages of various embodiments of the invention to reduce the required DC coupling capacitance to regulate the DC link voltage ripples are shown by comparing the experimental results in FIGS. 11A-C and 12A-C. The experimental results in FIGS. 11A-C and 12A-C compare the DC link voltage ripples of the CHB converter with and without using the AC side harmonics ($i_{in-3}(t)$, $i_{in-5}(t)$, ...) based on various embodiments of the invention respectively. FIG. 11A shows the time-domain waveforms of $v_{ac-CHB}(t)$, $v_{ac-Grid}(t)$ and $i_{in}(t)$ 1100A when the maximum fundamental current is 15 A and the odd order current harmonics are controlled to reduce the second order DC link voltage harmonics. The time-domain waveforms of the $v_{dc1}(t)$, $v_{dc2}(t)$ and $v_{dc3}(t)$ 1100B are shown in FIG. 11B for the case that the second order DC link voltage harmonics are controlled. FIG. 11C shows that the current harmonics 1100C meet the requirements of the IEEE-519 for both harmonics and TDD. FIG. 12A shows the time-domain waveforms of $v_{ac-CHB}(t)$, $v_{ac-Grid}(t)$ and $i_{in}(t)$ 1200A when the maximum fundamental current is 15 A and the odd order current harmonics are not controlled to reduce the second order DC link voltage harmonics. The time-domain waveforms of the $v_{dc1}(t)$, $v_{dc2}(t)$ and $v_{dc3}(t)$ 1200B are shown in FIG. 12B for the case that the second order DC link voltage harmonic is not controlled based on the derived equations. As shown, DC link voltage ripples when the odd order current harmonics are not used to reduce the DC link voltage ripples are 13.2% higher than the DC link voltage ripples when the second order DC link voltage harmonics are controlled as shown in FIG. 11B. FIG. 12C shows that the current harmonics 1200C meet the requirements of the IEEE-519 for both harmonics and TDD.

Advantages of Various Embodiments

Various embodiments of the invention provide CHB converters with several advantages over convention CHB converters. By using various embodiments of the modeling, the DC current harmonics of all cells of a CHB converter can be balanced including the zero and second-order current harmonics. This balancing has several advantages. First, due to balancing and regulating the even-order current harmonics of all cells, the DC side current harmonics of the batteries for the cells are equal. So, the lifespan of all the batteries can be kept the same due to dealing with the similar current harmonic spectrums.

Second, controlling the odd-order AC side current harmonics of the converter can reduce the even-order harmonics of the DC sides of the converter. This reduction can increase the lifespans of the batteries. In addition, by reducing/mitigating the harmonics on the DC sides of the converter, the DC link voltage ripples can be reduced. Accordingly, in various embodiments, this reduction of DC link voltage ripples is achieved without increasing the AC side filtering inductance of the converter ($L_F$). In addition, the zero-order harmonic (DC power of each cell) that flows through the batteries can be balanced without using DC current sensors. As a result, the cost of the converter can be reduced due to eliminating the DC current sensors.

Third, various embodiments reduce the DC current harmonics of the cells, which can reduce the required DC decoupling capacitor of each cell of the CHB converter. This can improve the reliability of the CHB converter and increase the lifespan of the converter for renewable energy sources and BESSs that are connected to the grid using the CHB converter.

Finally, the low-switching frequency asymmetric selective harmonic current mitigation-pulse width modulation (ASHCM-PWM) used in various embodiments meets the requirements of the IEEE 519 standard for AC side harmonics. As a result, the converter can have low-switching losses due to having a low-switching frequency.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for controlling DC side current harmonics of a cascaded H-bridge (CHB) converter comprising a plurality of cells, the method comprising:

injecting an odd-order current harmonic at an AC side of the CHB converter to control the DC side current harmonics for the plurality of cells of the CHB converter based at least in part on an optimization of a constrained optimization problem to achieve at least one of balancing the DC side current harmonics of the plurality of cells or reducing the DC side current harmonics of the plurality of cells, the optimization problem comprising a cost function based at least in part on switching transitions of the CHB converter and at least one constraint based at least in part on an AC side current harmonic and a zero-order DC side current harmonic and an hth-order DC side current harmonic for each cell of the plurality of cells for the CHB converter, wherein h is an even number.

2. The method of claim 1, wherein the optimization of the constrained optimization problem further achieves meeting the requirements of Institute of Electrical and Electronic Engineers (IEEE) 519 standard and the at least one constraint is based at least in part on a maximum demand load current of the CHB converter based on the IEEE 519 standard.

3. The method of claim 1, wherein the odd-order current harmonic comprises a third-order harmonic and controlling the DC side current harmonics comprises balancing the zero-order and a second-order DC side current harmonics for the plurality of cells of the CHB converter.

4. The method of claim 3, wherein balancing the zero-order and the second-order DC side current harmonics for the plurality of cells is accomplished without using DC current sensors.

5. The method of claim 1, wherein controlling the DC side current harmonics results in reducing DC link voltage ripples.

6. The method of claim 1, wherein:
the plurality of cells comprises three cells;
the cost function comprises:
and
the at least one constraint of the optimization problem comprises:

$$\begin{cases} \left|\dfrac{I_{in-n}}{I_L}\right| = \left|\dfrac{2V_b\sqrt{(\cos(n\theta_1)-\cos(n\theta_2)+\ldots-\cos(n\theta_{18}))^2 + (\sin(n\theta_1)-\sin(n\theta_2)+\ldots-\sin(n\theta_{18}))^2}}{(\pi n^2 \omega L_T)I_L}\right| \le l_n, \\ \text{AC side current} \\ \text{for } 3 \le n \le 49 \\ \dfrac{\sqrt{(I_{in-3})^2 + (I_{in-5})^2 + \ldots + (I_{in-49})^2}}{I_L} \le l_{TDD}, \\ \text{DC side current} \\ a_{cell-Average} = \dfrac{1}{3}(a_{cell-1-0} + a_{cell-2-0} + a_{cell-3-0}) \\ |a_{cell-1-0} - a_{cell-Average}| \le e_0, \\ |a_{cell-2-0} - a_{cell-Average}| \le e_0, \\ |a_{cell-3-0} - a_{cell-Average}| \le e_0, \\ I_{cell-Average} = \dfrac{1}{3}\left(\sqrt{(a_{cell-1-2})^2 + (b_{cell-1-2})^2} + \sqrt{(a_{cell-2-2})^2 + (b_{cell-2-2})^2} + \sqrt{(a_{cell-3-2})^2 + (b_{cell-3-2})^2}\right) \\ \left|\sqrt{(a_{cell-1-2})^2 + (b_{cell-1-2})^2} - I_{cell-Aerage}\right| \le e_2, \\ \left|\sqrt{(a_{cell-2-2})^2 + (b_{cell-2-2})^2} - I_{cell-Aerage}\right| \le e_2. \\ \left|\sqrt{(a_{cell-3-2})^2 + (b_{cell-3-2})^2} - I_{cell-Aerage}\right| \le e_2. \end{cases}$$

$$a_{cell-1-0} = \sum_{n=1}^{\infty}\left(\dfrac{-2I_n}{n\pi}(\cos(n(\theta_{CHB}+\theta_{18})+\theta_{in-n}) - \cos(n(\theta_{CHB}+\theta_{17})+\theta_{in-n}) + \ldots - \cos(n(\theta_{CHB}+\theta_1)+\theta_{in-n}))\right),$$

$$a_{cell-1-h} = \sum_{n=1}^{\infty}\left(\dfrac{-I_n}{\pi}\left(\dfrac{1}{n+2h}(\cos((n+2h)(\theta_{CHB}+\theta_{18})+\theta_{in-n}) - \cos((n+2h)(\theta_{CHB}+\theta_{17})+\theta_{in-n}) + \ldots - \cos((n+2h)(\theta_{CHB}+\theta_1)+\theta_{in-n})) + \dfrac{1}{n-2h}(\cos((n-2h)(\theta_{CHB}+\theta_{18})+\theta_{in-n}) - \cos((n-2h)(\theta_{CHB}+\theta_{17})+\theta_{in-n}) + \ldots - \cos((n-2h)(\theta_{CHB}+\theta_1)+\theta_{in-n})))\right),$$

$$b_{cell-1-h} = \sum_{n=1}^{\infty}\left(\dfrac{I_n}{\pi}\left(\dfrac{1}{n-2h}(\sin((n-2h)(\theta_{CHB}+\theta_{18})+\theta_{in-n}) - \sin((n-2h)(\theta_{CHB}+\theta_{17})+\theta_{in-n}) + \ldots - \sin((n-2h)(\theta_{CHB}+\theta_1)+\theta_{in-n})) - \dfrac{1}{n+2h}(\sin((n+2h)(\theta_{CHB}+\theta_{18})+\theta_{in-n}) - \sin((n+2h)(\theta_{CHB}+\theta_{17})+\theta_{in-n}) + \ldots - \sin((n+2h)(\theta_{CHB}+\theta_1)+\theta_{in-n})))\right),$$

wherein $I_L$ comprises a maximum demand load current of the CHB converter, $l_n$ comprises a current harmonic, $I_{SC}$ comprises a short circuit current at a connection point, $l_{TDD}$ comprises a total demand distortion limits when $I_L/I_{SC}<20$, and $e_0$ and $e_2$ comprise errors of the zero-order and the second-order harmonics of the DC currents for the plurality of cells, and wherein $M_a$ is a modulation index of the CHB converter, $V_b$ is a DC link voltage of the CHB converter, $\Theta_i$ is an ith switching angle of the CHB converter, $I_{in-n}$ is an nth odd order current harmonic magnitude of the AC side of the CHB converter, $L_T$ is a coupling inductance of the CHB converter, $\omega$ is a frequency of the CHB converter, $a_{cell-Average}$ is an average of zero-order DC side current harmonics that are generated by the three cells, $a_{cell-Average}$ is a zero-order DC side current harmonic that is generated by a first cell of the three cells, $a_{cell-2-0}$ is a zero-order DC side current harmonic that is generated by a second cell of the three cells, $a_{cell-3-0}$ is a zero-order DC side current harmonic that is generated by a third cell of the three cells, $a_{cell-1-2}$ is an a component of a second-order DC side current harmonic that is generated by the first cell of the three cells, $b_{cell-1-2}$ is a b component of the second-order DC side current harmonic that is generated by the first cell of the three cells, $a_{cell-2-2}$ is an a component of a second-order DC side current harmonic that is generated by the second cell of the three cells, $b_{cell-2-2}$ is a b component of the second-order DC side current harmonic that is generated by the second cell of the three cells, $a_{cell-3-2}$ is an a component of a second-order DC side current harmonic that is generated by the third cell of the three cells, $b_{cell-3-2}$ is a b component of the second-order DC side current harmonic that is generated by the third cell of the three cells, $I_{cell\_Average}$ is an average of the three second-order DC side current harmonics, $\Theta_{CHB}$ is an initial phase of a fundamental voltage of the CHB converter, $\Theta_{in-n}$ is an nth odd order current harmonic phase of the AC side of the CHB converter.

7. The method of claim 1, wherein each of the plurality of DC cells is connected to a battery energy storage system.

8. A cascaded H-bridge (CHB) converter comprising:
a plurality of cells, wherein a DC side current harmonics for the plurality of cells is controlled by injecting an odd-order current harmonic at an AC side of the CHB converter based at least in part on an optimization of a constrained optimization problem to achieve at least one of balancing the DC side current harmonics of the plurality of cells or reducing the DC side current harmonics of the plurality of cells, the optimization problem comprising a cost function based at least in part on switching transitions of the CHB converter and at least one constraint based at least in part on an AC side current harmonic and a zero-order DC side current harmonic and an hth-order DC side current harmonic for each cell of the plurality of cells for the CHB converter, wherein h is an even number.

9. The CHB converter of claim 8, wherein the optimization of the constrained optimization problem further achieves meeting the requirements of Institute of Electrical and Electronic Engineers (IEEE) 519 standard and the at least one constraint is based at least in part on a maximum demand load current of the CHB converter based on the IEEE 519 standard.

10. The CHB converter of claim 8, wherein the odd-order current harmonic comprises a third-order harmonic and controlling the DC side current harmonics comprises balancing the zero-order and a second-order DC side current harmonics for the plurality of cells of the CHB converter.

11. The CHB converter of claim 10, wherein balancing the zero-order and the second-order DC side harmonics for the plurality of cells is accomplished without using DC current sensors.

12. The CHB converter of claim 8, wherein controlling the DC side current harmonics results in reducing DC link voltage ripples.

13. The CHB converter of claim 8, wherein:
the plurality of cells comprises three cells;
the cost function comprises:
and
the at least one constraint of the optimization problem comprises:

$$\begin{cases} AC \text{ side current} \\ \left|\frac{I_{in-n}}{I_L}\right| = \left|\frac{2V_b\sqrt{(\cos(n\theta_1)-\cos(n\theta_2)+\ldots-\cos(n\theta_{18}))^2 + (\sin(n\theta_1)-\sin(n\theta_2)+\ldots-\sin(n\theta_{18}))^2}}{(\pi n^2 \omega L_T) I_L}\right| \leq I_n, \\ \quad \text{for } 3 \leq n \leq 49 \\ \frac{\sqrt{(I_{in-3})^2+(I_{in-5})^2+\ldots+(I_{in-49})^2}}{I_L} \leq I_{TDD}, \\ DC \text{ side current} \\ a_{cell-Average} = \frac{1}{3}(a_{cell-1-0}+a_{cell-2-0}+a_{cell-3-0}) \\ |a_{cell-1-0} - a_{cell-Average}| \leq e_0, \\ |a_{cell-2-0} - a_{cell-Average}| \leq e_0, \\ |a_{cell-3-0} - a_{cell-Average}| \leq e_0, \\ I_{cell-Average} = \frac{1}{3}\left(\sqrt{(a_{cell-1-2})^2+(b_{cell-1-2})^2} + \sqrt{(a_{cell-2-2})^2+(b_{cell-2-2})^2} + \sqrt{(a_{cell-3-2})^2+(b_{cell-3-2})^2}\right) \\ \left|\sqrt{(a_{cell-1-2})^2+(b_{cell-1-2})^2} - I_{cell-Aerage}\right| \leq e_2, \\ \left|\sqrt{(a_{cell-2-2})^2+(b_{cell-2-2})^2} - I_{cell-Aerage}\right| \leq e_2. \\ \left|\sqrt{(a_{cell-3-2})^2+(b_{cell-3-2})^2} - I_{cell-Aerage}\right| \leq e_2. \end{cases}$$

-continued $$a_{cell-1-0} = \sum_{n=1}^{\infty}\left(\frac{-2I_n}{n\pi}(\cos(n(\theta_{CHB}+\theta_{18})+\theta_{in-n})-\cos(n(\theta_{CHB}+\theta_{17})+\theta_{in-n})+ \ldots -\cos(n(\theta_{CHB}+\theta_1)+\theta_{in-n}))\right),$$

$$a_{cell-1-h} = \sum_{n=1}^{\infty}\left(\frac{-I_n}{\pi}\left(\frac{1}{n+2h}(\cos((n+2h)(\theta_{CHB}+\theta_{18})+\theta_{in-n}) - \cos((n+2h)(\theta_{CHB}+\theta_{17})+\theta_{in-n})+\ldots - \cos((n+2h)(\theta_{CHB}+\theta_1)+\theta_{in-n})) + \frac{1}{n-2h}(\cos((n-2h)(\theta_{CHB}+\theta_{18})+\theta_{in-n}) - \cos((n-2h)(\theta_{CHB}+\theta_{17})+\theta_{in-n})+\theta_{in-n})+\ldots - \cos((n-2h)(\theta_{CHB}+\theta_1)+\theta_{in-n}))\right)\right),$$

$$b_{cell-1-h} = \sum_{n=1}^{\infty}\left(\frac{I_n}{\pi}\left(\frac{1}{n-2h}(\sin((n-2h)(\theta_{CHB}+\theta_{18})+\theta_{in-n}) - \sin((n-2h)(\theta_{CHB}+\theta_{17})+\theta_{in-n})+\ldots - \sin((n-2h)(\theta_{CHB}+\theta_1)+\theta_{in-n})) - \frac{1}{n+2h}(\sin((n+2h)(\theta_{CHB}+\theta_{18})+\theta_{in-n}) - \sin((n+2h)(\theta_{CHB}+\theta_{17})+\theta_{in-n})+\theta_{in-n})+\ldots - \sin((n+2h)(\theta_{CHB}+\theta_1)+\theta_{in-n}))\right)\right),$$

wherein $I_L$ comprises a maximum demand load current of the CHB converter, $1_n$ comprises a current harmonic, $I_{SC}$ comprises a short circuit current at a connection point, $1_{TDD}$ comprises a total demand distortion limits when $I_{SC}/I_L<20$, and $e_0$ and $e_2$ comprise errors of the zero-order and the second-order harmonics of the DC currents for the plurality of cells, and wherein $M_a$ is a modulation index of the CHB converter, $V_b$ is a DC link voltage of the CHB converter, $\Theta_i$ is an ith switching angle of the CHB converter, $I_{in-n}$ is an nth odd order current harmonic magnitude of the AC side of the CHB converter, $L_T$ is a coupling inductance of the CHB converter, $\omega$ is a frequency of the CHB converter, $a_{cell-Average}$ is an average of zero-order DC side current harmonics that are generated by the three cells, $a_{cell-1-0}$ is a zero-order DC side current harmonic that is generated by a first cell of the three cells, $a_{cell-2-0}$ is a zero-order DC side current harmonic that is generated by a second cell of the three cells, $a_{cell-3-0}$ is a zero-order DC side current harmonic that is generated by a third cell of the three cells, $a_{cell-1-2}$ is an a component of a second-order DC side current harmonic that is generated by the first cell of the three cells, $b_{cell-1-2}$ is a b component of the second-order DC side current harmonic that is generated by the first cell of the three cells, $a_{cell-2-2}$ is an a component of a second-order DC side current harmonic that is generated by the second cell of the three cells, $b_{cell-2-2}$ is a b component of the second-order DC side current harmonic that is generated by the second cell of the three cells, $a_{cell-3-2}$ is an a component of a second-order DC side current harmonic that is generated by the third cell of the three cells, $b_{cell-3-2}$ is a b component of the second-order DC side current harmonic that is generated by the third cell of the three cells, $I_{cell\_Average}$ is an average of the three second-order DC side current harmonics, $\Theta_{CHB}$ is an initial phase of a fundamental voltage of the CHB converter, $\Theta_{in\text{-}n}$ is an nth odd order current harmonic phase of the AC side of the CHB converter.

14. The CHB converter of claim 8, wherein each of the plurality of DC cells is connected to a battery energy storage system.

15. A non-transitory computer storage medium comprising instructions for controlling DC side current harmonics of a cascaded H-bridge (CHB) converter comprising a plurality of cells, the instructions being configured to cause one or more processors to at least perform operations configured to:

determine an odd-order current harmonic to inject at an AC side of the CHB converter based at least in part on an optimization of a constrained optimization problem to control a DC side current harmonics for the plurality of cells of the CHB converter to achieve at least one of balancing the DC side current harmonics of the plurality of cells, reducing the DC side current harmonics of the plurality of cells, or meeting the requirements of Institute of Electrical and Electronic Engineers (IEEE) 519 standard, the optimization problem comprising a cost function based at least in part on switching transitions of the CHB converter and at least one constraint based at least in part on an AC side current harmonic, a maximum demand load current of the CHB converter based on the IEEE standard 519, and a zero-order DC side current harmonic and an hth-order DC side current harmonic for each cell of the plurality of cells for the CHB converter, wherein h is an even number.

16. The non-transitory computer storage medium of claim 15, wherein the optimization of the constrained optimization problem further achieves meeting the requirements of Institute of Electrical and Electronic Engineers (IEEE) 519 standard and the at least one constraint is based at least in part on a maximum demand load current of the CHB converter based on the IEEE 519 standard.

17. The non-transitory computer storage medium of claim 15, wherein the odd-order current harmonic comprises a third-order harmonic and controlling the DC side current harmonics comprises balancing the zero-order and a second-order DC side current harmonics for the plurality of cells of the CHB converter.

18. The non-transitory computer storage medium of claim 17, wherein balancing the zero-order and the second-order DC side current harmonics for the plurality of cells is accomplished without using DC current sensors.

19. The non-transitory computer storage medium of claim 15, wherein controlling the DC side current harmonics results in reducing DC link voltage ripples.

20. The non-transitory computer storage medium of claim 15, wherein:
the plurality of cells comprises three cells;
the cost function comprises:
and
the at least one constraint of the optimization problem comprises:

$$\begin{cases} \text{AC side current} \\ \left|\dfrac{I_{in\text{-}n}}{I_L}\right| = \left|\dfrac{2V_b\sqrt{(\cos(n\theta_1)-\cos(n\theta_2)+\ldots-\cos(n\theta_{18}))^2 + (\sin(n\theta_1)-\sin(n\theta_2)+\ldots-\sin(n\theta_{18}))^2}}{(\pi n^2 \omega L_T)I_L}\right| \le I_n, \\ \text{for } 3 \le n \le 49 \\ \dfrac{\sqrt{(I_{in\text{-}3})^2 + (I_{in\text{-}5})^2 + \ldots + (I_{in\text{-}49})^2}}{I_L} \le I_{TDD}, \\ \text{DC side current} \\ a_{cell\text{-}Average} = \dfrac{1}{3}(a_{cell\text{-}1\text{-}0} + a_{cell\text{-}2\text{-}0} + a_{cell\text{-}3\text{-}0}) \\ |a_{cell\text{-}1\text{-}0} - a_{cell\text{-}Average}| \le e_0, \\ |a_{cell\text{-}2\text{-}0} - a_{cell\text{-}Average}| \le e_0, \\ |a_{cell\text{-}3\text{-}0} - a_{cell\text{-}Average}| \le e_0, \\ I_{cell\text{-}Average} = \dfrac{1}{3}\left(\sqrt{(a_{cell\text{-}1\text{-}2})^2 + (b_{cell\text{-}1\text{-}2})^2} + \sqrt{(a_{cell\text{-}2\text{-}2})^2 + (b_{cell\text{-}2\text{-}2})^2} + \sqrt{(a_{cell\text{-}3\text{-}2})^2 + (b_{cell\text{-}3\text{-}2})^2}\right) \\ \left|\sqrt{(a_{cell\text{-}1\text{-}2})^2 + (b_{cell\text{-}1\text{-}2})^2} - I_{cell\text{-}Aerage}\right| \le e_2, \\ \left|\sqrt{(a_{cell\text{-}2\text{-}2})^2 + (b_{cell\text{-}2\text{-}2})^2} - I_{cell\text{-}Aerage}\right| \le e_2. \\ \left|\sqrt{(a_{cell\text{-}3\text{-}2})^2 + (b_{cell\text{-}3\text{-}2})^2} - I_{cell\text{-}Aerage}\right| \le e_2. \end{cases}$$

$$a_{cell\text{-}1\text{-}0} = \sum_{n=1}^{\infty}\left(\dfrac{-2I_n}{n\pi}(\cos(n(\theta_{CHB}+\theta_{18})+\theta_{in\text{-}n}) - \cos(n(\theta_{CHB}+\theta_{17})+\theta_{in\text{-}n}) + \ldots - \cos(n(\theta_{CHB}+\theta_1)+\theta_{in\text{-}n}))\right),$$

$$a_{cell\text{-}1\text{-}h} = \sum_{n=1}^{\infty}\left(\dfrac{-I_n}{\pi}\left(\dfrac{1}{n+2h}(\cos((n+2h)(\theta_{CHB}+\theta_{18})+\theta_{in\text{-}n}) - \cos((n+2h)(\theta_{CHB}+\theta_{17})+\theta_{in\text{-}n}) + \ldots - \cos((n+2h)(\theta_{CHB}+\theta_1)+\theta_{in\text{-}n})) + \dfrac{1}{n-2h}(\cos((n-2h)(\theta_{CHB}+\theta_{18})+\theta_{in\text{-}n}) - \cos((n-2h)(\theta_{CHB}+\theta_{17})+\theta_{in\text{-}n}) + \ldots - \cos((n-2h)(\theta_{CHB}+\theta_1)+\theta_{in\text{-}n}))\right)\right),$$

$$b_{cell\text{-}1\text{-}h} = \sum_{n=1}^{\infty}\left(\dfrac{I_n}{\pi}\left(\dfrac{1}{n-2h}(\sin((n-2h)(\theta_{CHB}+\theta_{18})+\theta_{in\text{-}n}) - \sin((n-2h)(\theta_{CHB}+\theta_{17})+\theta_{in\text{-}n}) + \ldots - \sin((n-2h)(\theta_{CHB}+\theta_1)+\theta_{in\text{-}n})) - \dfrac{1}{n+2h}(\sin((n+2h)(\theta_{CHB}+\theta_{18})+\theta_{in\text{-}n}) - \sin((n+2h)(\theta_{CHB}+\theta_{17})+\theta_{in\text{-}n}) + \ldots - \sin((n+2h)(\theta_{CHB}+\theta_1)+\theta_{in\text{-}n}))\right)\right),$$

wherein $I_L$ comprises a maximum demand load current of the CHB converter, $I_n$ comprises a current harmonic, $I_{SC}$ comprises a short circuit current at a connection point, $I_{TDD}$ comprises total demand distortion limits when $I_L/I_{SC}<20$, and $e_0$ and $e_2$ comprise errors of the zero-order and the second-order harmonics of the DC currents for the plurality of cells, and wherein $M_a$ is a modulation index of the CHB converter, $V_b$ is a DC link voltage of the CHB converter, $\Theta_i$ is an ith switching angle of the CHB converter, $I_{in\text{-}n}$ is an nth odd order current harmonic magnitude of the AC side of the CHB converter, $L_T$ is a coupling inductance of the CHB converter, $\omega$ is a frequency of the CHB converter, $a_{cell\text{-}Average}$ is an average of zero-order DC side current harmonics that are generated by the three cells, $a_{cell\text{-}1\text{-}0}$ is a zero-order DC side current harmonic that is generated by a first cell of the three cells, $a_{cell\text{-}2\text{-}0}$ is a zero-order DC side current harmonic that is generated by a second cell of the three cells, $a_{cell\text{-}3\text{-}0}$ is a zero-order DC side current harmonic that is generated by a third cell of the three cells, $a_{cell\text{-}1\text{-}2}$ is an a component of a second-order DC side current harmonic that is generated by the first cell of the three cells, $b_{cell\text{-}1\text{-}2}$ is a b component of the second-order DC side current harmonic that is generated by the first cell of the three cells, $a_{cell\text{-}2\text{-}2}$ is an a component of a second-order DC side current harmonic that is generated by the second cell of the three cells, $b_{cell\text{-}2\text{-}2}$ is a b component of the second-order DC side current harmonic that is generated by the second cell of the three cells, $a_{cell\text{-}3\text{-}2}$ is an a component of a second-order DC side current harmonic that is generated by the third cell of the three cells, $b_{cell\text{-}3\text{-}2}$ is a b component of the second-order DC side current harmonic that is generated by the third cell of the three cells, $I_{cell\_Average}$ is an average of the three second-order DC side current harmonics, $\Theta_{CHB}$ is an initial phase of a fundamental voltage of the CHB converter, $\Theta_{in\text{-}n}$ is an nth odd order current harmonic phase of the AC side of the CHB converter.

21. The non-transitory computer storage medium of claim 15, wherein each of the plurality of DC cells is connected to a battery energy storage system.

* * * * *